(12) United States Patent
Nelson

(10) Patent No.: US 6,381,937 B1
(45) Date of Patent: May 7, 2002

(54) COTTON HARVESTER HEADER ASSEMBLY CONTAINING PADDLE CHAIN FRAME UNIT, STRIPPER BAR UNIT AND HEIGHT SENSING UNIT

(76) Inventor: Joe D. Nelson, P.O. Box 1482, Seminole, TX (US) 79360

( * ) Notice: Subject to any disclaimer, the term of this patent is extended or adjusted under 35 U.S.C. 154(b) by 0 days.

(21) Appl. No.: 09/609,334

(22) Filed: Jun. 30, 2000

(51) Int. Cl.$^7$ ............................................... A01D 46/12
(52) U.S. Cl. ................................ 56/33; 56/34; 56/127
(58) Field of Search ............................. 56/33, 34, 37, 56/29, 127, 330, 35, 38, 44, 45, 49

(56) References Cited

U.S. PATENT DOCUMENTS

| | | | |
|---|---|---|---|
| 44,828 A | * 10/1864 | Stephens | 56/34 |
| 131,124 A | 9/1872 | Sims | |
| 955,098 A | 4/1910 | Pavy | |
| 1,106,019 A | 8/1914 | Wilcoxson | |
| 1,368,014 A | 2/1921 | Bauert | |
| 1,404,246 A | * 1/1922 | Stukenborg | 56/39 |
| 1,568,530 A | 1/1926 | Prichard | |
| 1,624,313 A | * 4/1927 | Carlson | 56/34 |
| 1,715,836 A | * 6/1929 | Horn | 56/34 |
| 1,907,467 A | * 5/1933 | Tervo et al. | 56/328.1 |
| 2,231,354 A | 2/1941 | Wilcox | |
| 2,445,162 A | 7/1948 | Wallace | |
| 2,616,236 A | 11/1952 | Hartley | |
| 2,835,095 A | 5/1958 | Self | |
| 3,015,928 A | 1/1962 | Kappelmann et al. | |
| 3,067,561 A | 12/1962 | Jezek | |
| 3,484,802 A | 12/1969 | Reece et al. | |
| 3,698,171 A | * 10/1972 | Hecht | 56/331 |
| 3,927,511 A | 12/1975 | Burris et al. | |
| 3,973,380 A | 8/1976 | Knollman et al. | |
| 4,147,016 A | 4/1979 | Jensen et al. | |
| 4,313,296 A | 2/1982 | Mitchell, Jr. | |
| 4,338,770 A | 7/1982 | Schlueter | |
| 4,358,921 A | 11/1982 | Pustejovsky | |
| 4,520,617 A | 6/1985 | Fachini et al. | |
| 4,722,173 A | 2/1988 | Covington et al. | |
| 4,993,216 A | 2/1991 | Covington et al. | |
| 5,090,184 A | 2/1992 | Garter et al. | |
| 5,115,628 A | 5/1992 | Garter et al. | |
| 5,191,757 A | 3/1993 | Fachini et al. | |
| 6,018,938 A | 2/2000 | Deutsch et al. | |
| 6,044,635 A | 4/2000 | Goering et al. | |

* cited by examiner

Primary Examiner—Robert E. Pezzuto
Assistant Examiner—Árpád Fábián Kovács
(74) Attorney, Agent, or Firm—Perry Carvellas, Esq.

(57) ABSTRACT

A broadcast cotton harvester header assembly containing two or more header units wherein each header unit includes (1) a paddle chain frame unit having a length and a width and operatively attached to a (2) stripper bar unit having an upper surface to harvest crops, and (3) a height sensing unit which senses and maintains the distance of the stripper bar unit relative to the ground. The broadcast cotton harvester header assembly unit includes two parallel frame members having a front and rear end. The rear end of the frame members have rotatably mounted thereon two drive sprockets. The front end of the frame members have mounted thereon two idler sprockets. The drive sprockets and idler sprockets have wrapped around them conveyor chains which rotate around the front and rear sprockets. The conveyor chains have attached to them, evenly spaced apart, two or more paddles, the paddles are attached to chain links by hinges. When the paddles are disposed-below the chain the paddles are at an angle of about 90° relative to the chain and when the paddles are disposed above the-chain they rotate by gravity about 90° forward in the direction of the rotation of the chain to assume a position parallel to the conveyor chain. The paddle chain unit is operatively connected to the stripper bar unit to the push crop stripped by the stripper bar unit rearward along the upper surface of the stripper bar unit.

17 Claims, 6 Drawing Sheets

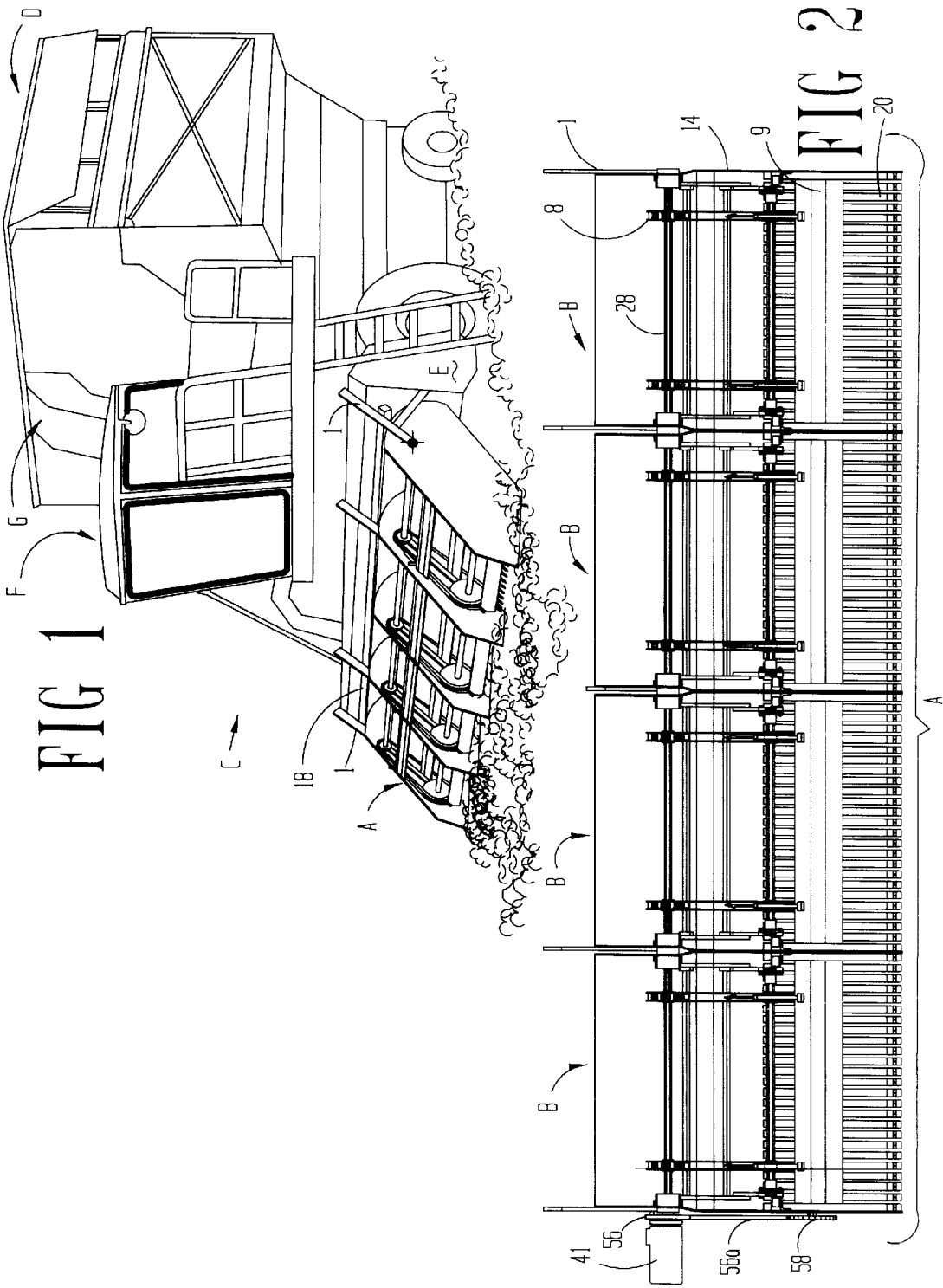

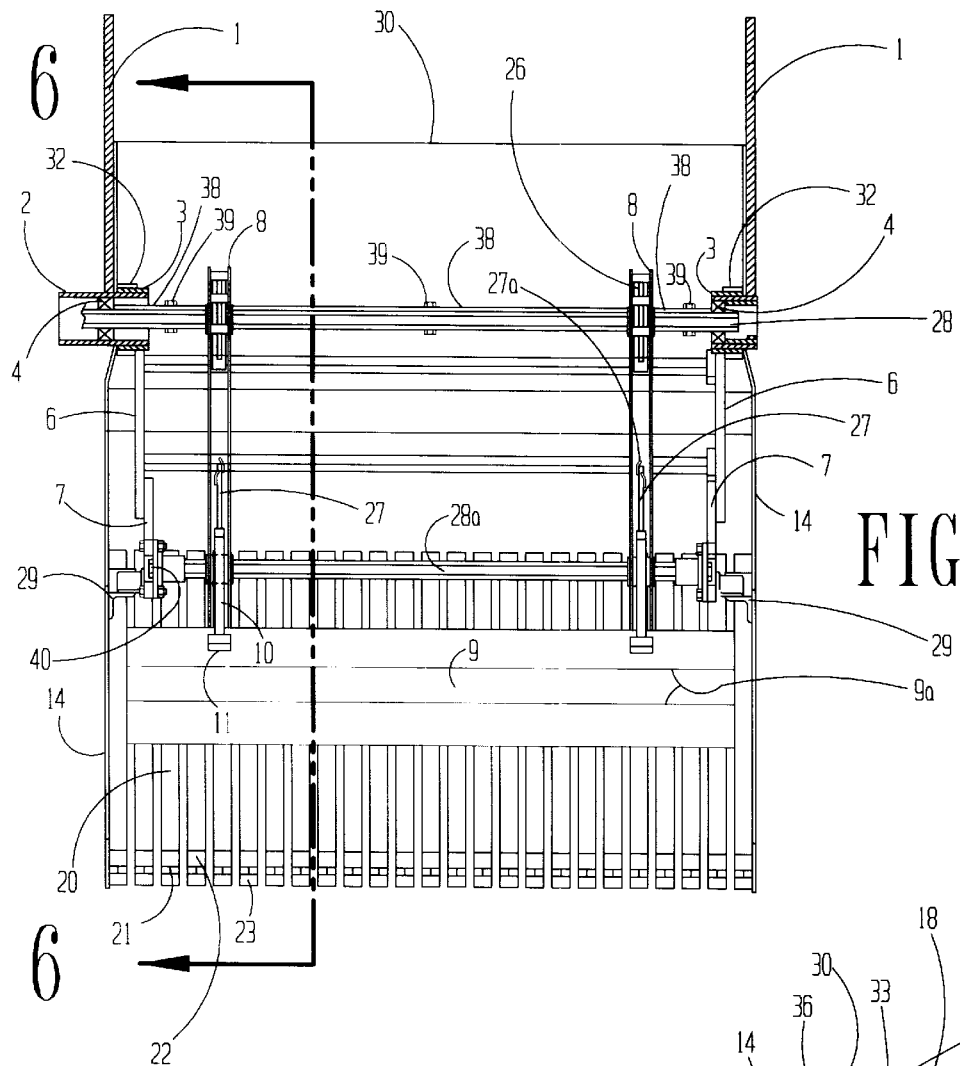
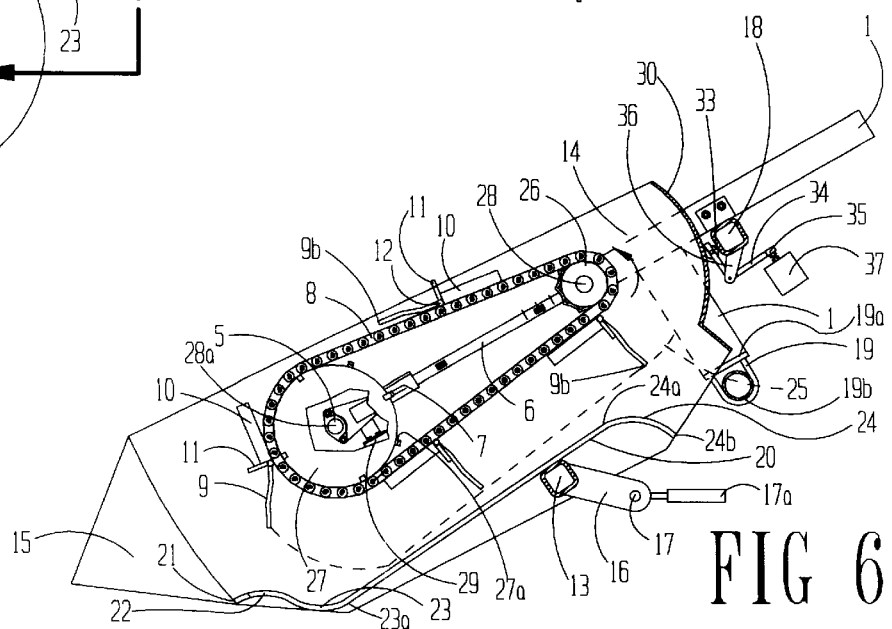

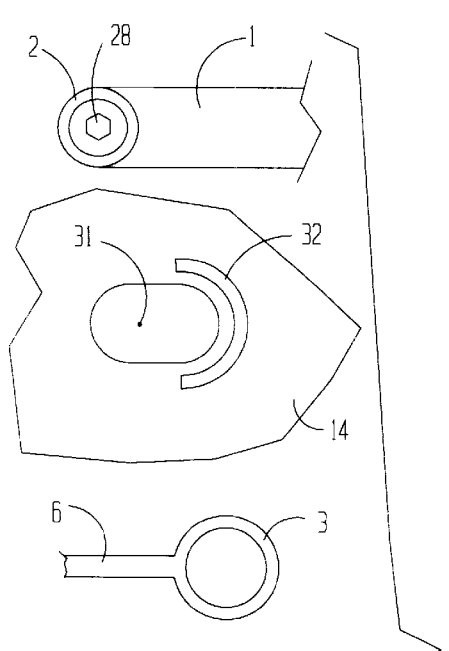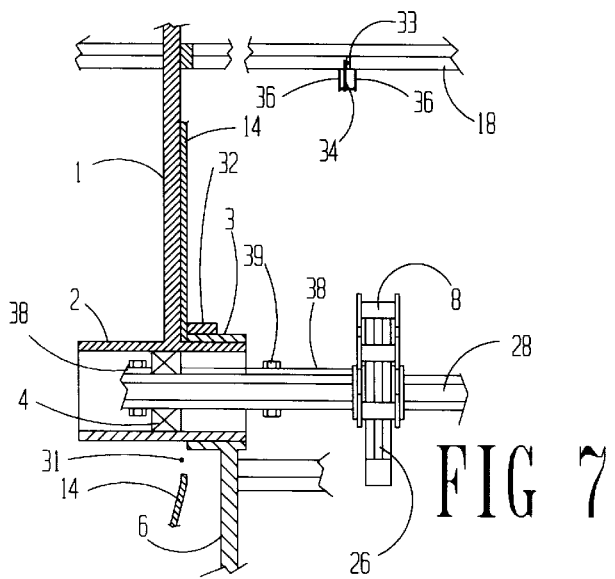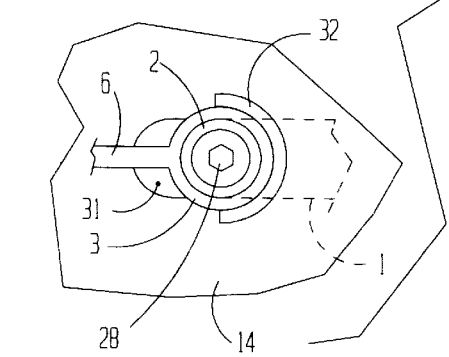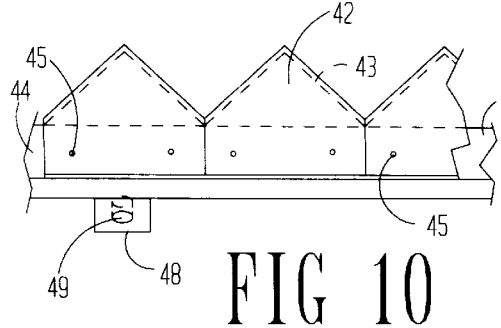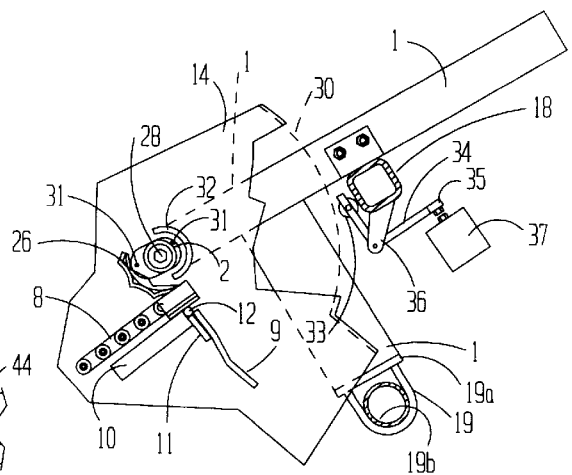
FIG 7
FIG 8
FIG 9
FIG 10

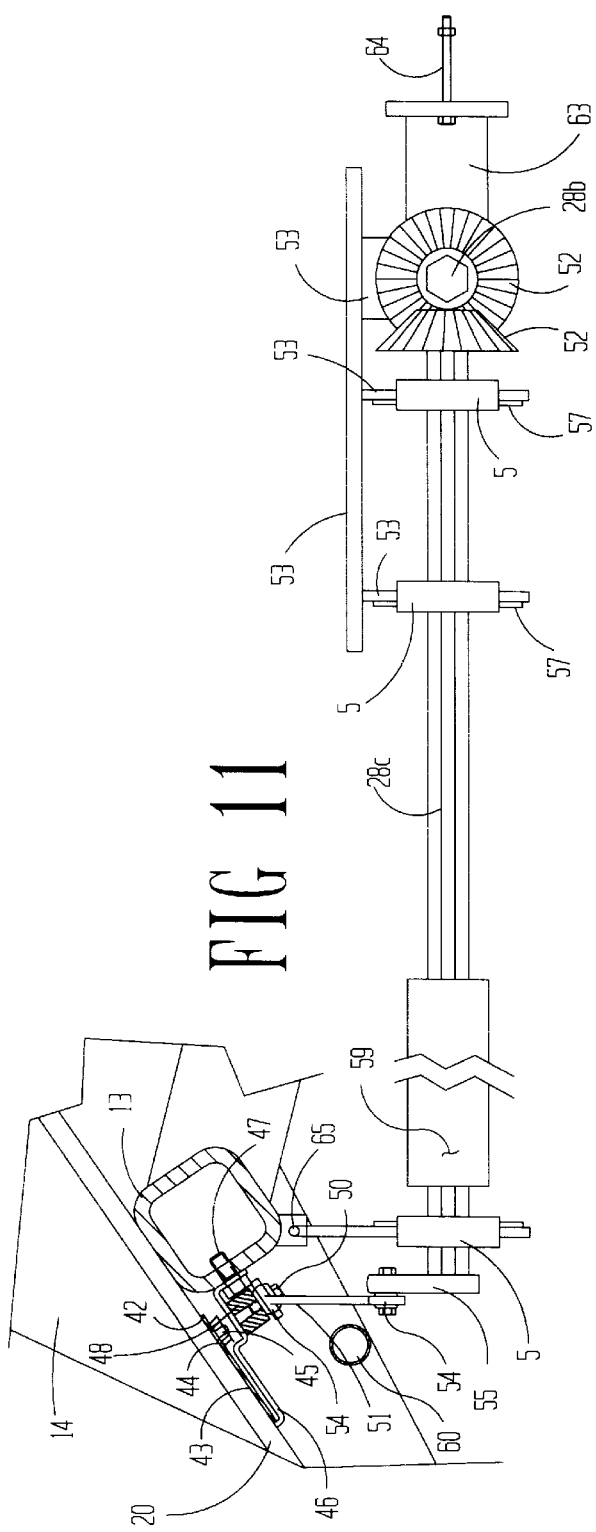
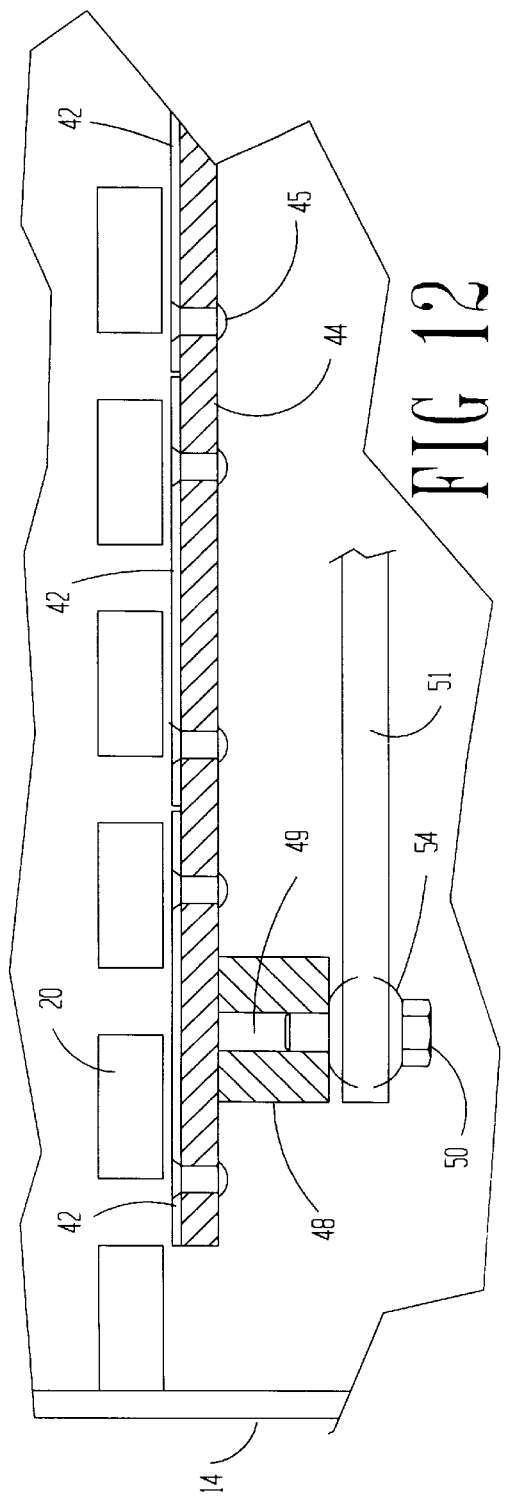

COTTON HARVESTER HEADER ASSEMBLY CONTAINING PADDLE CHAIN FRAME UNIT, STRIPPER BAR UNIT AND HEIGHT SENSING UNIT

FIELD OF THE INVENTION

The present invention relates to cotton harvesters and more specifically to a broadcast cotton harvester capable of harvesting a wide swath of cotton in a single pass. The present invention specifically relates to broadcast cotton harvesters using multiple header units arranged as a single header assembly wherein each header unit has a plurality of stripper bars to strip cotton from broadcast cotton stalks.

Broadcast cotton is planted differently from the way conventional cotton is planted. Conventional cotton is planted in rows usually thirty-six to forty inches apart. The seed rate in row planted cotton usually ranges from nine to sometimes twenty-five pounds per acre. This allows the amount of seed per foot of row to range from three seed per foot to as many as fifteen or more seed per foot. The problem with this style of planting cotton is that the plants are crowded into a row so that they can be harvested with a stripper row header. This crowding of the plants limits their aggregate production. Row cotton consists of a crowded row of plants and a wide space between rows that is left unproductive. However, until now, row cotton was necessary in order to harvest the crop with a minimal amount of waste.

Broadcast cotton can be planted in any width row, or even not in a row at all. The idea of broadcast cotton is to spread the plants out across the land so that ideally an even distance from one plant to the next is acquired. Plants that are evenly spread out utilize their environment better and produce better yields. Broadcast cotton has been proven to utilize water, fertilizer, and land better than row cotton. The number of plants per acre can be increased without crowding the plants. The leaf canopy of the crop keeps the ground shaded, cool, and moist. Therefore, water is utilized better because the land is shaded by the dispersed plant population. This also allows irrigation water or rain to be readily soaked into the ground and stored where the sun cannot heat the ground and evaporate the water. The leaf and plant canopy shading the ground also helps keep weeds from germinating and growing to compete with the cotton crop as a result of a lack of sunlight. The plant population of broadcast cotton will usually be double that of the row cotton for the same land quantity and quality, water availability, fertilizer application, weed control, chemicals, or other management input. The broadcast cotton plants are usually smaller than row cotton. However, cotton plants that are too large are also a problem. The small cotton plants or cotton plants that are too large combined with the random placement of the plant population has posed a problem for harvesting in the past. The broadcast cotton harvesting headers of the past have at best left much cotton unharvested and wasted in the field. Not enough growth in height of the cotton plant and too much uncontrolled growth of the cotton plant or weeds have been a major concern of the past when planting and harvesting broadcast cotton. The stripper headers of the broadcast cotton harvester of the past had to have optimum conditions in order to function at even a less than acceptable level. Weeds of any size, cotton plants that are too short or too tall, unlevel or rough ground, not enough production to push the cotton into a cotton harvester header, too much moisture in the plant stalk, cotton still too green after defoliation, or the combination of these problems with yet others have plagued the harvesting process of broadcast cotton. The theory of broadcast cotton being more productive is generally accepted by all producers, but harvesting in the past has been inefficient, difficult, and not productive.

There are discussed below various prior patents relating to harvesting combine machines.

Deutsch, et al. U.S. Pat. No. 6,018,938 discloses a row cotton harvester which includes eight or more brush type row units mounted on a cross auger system having a split cross auger structure with two auger portions for moving material inwardly toward a central location. Cotton is conveyed through the rear of the central location into two separation chambers, one for each auger portion, and into the lower portions of two corresponding conveying ducts which extend upwardly and outwardly at bend locations located just above the rockshaft and below the cab floor. Each duct includes a nozzle directing air upwardly above the bend location so that cotton is sucked into the bend. Garter, et al. U.S. Pat. No. 5,115,628 discloses a height control system for a cotton harvester which adjusts the elevation of a harvesting unit supported for vertical movement. The height control system includes a signal receiving apparatus movable within a range of movement and arranged in combination with a lift mechanism for adjusting the elevation of the harvesting unit. A signal transmitting mechanism carried on the harvesting unit for ground engagement is connected to the signal receiving apparatus for causing the lift mechanism to effect harvesting unit elevation correlated with vertical movement of the signal transmitting mechanism relative to the harvesting unit. A linkage assembly interconnects the signal receiving apparatus and signal transmitting mechanism. Mitchell U.S. Pat. No. 4,313,296 discloses a broadcast cotton stripper harvester in which cotton bolls, along the fingers of the cotton stripper, are brushed upward to the conveyor by brushes mounted upon chains which run on sprockets on either side of the fingers. The speed of the brushes along the finger is slower than the speed of the stripper along the ground and also slower than 300 feet per minute to prevent throwing the light fluffy cotton from the stripper. Jensen, et al. U.S. Pat. No. 4,147,016 disclose a broadcast cotton stripper harvester which comprises a cotton stripper, a plurality of cotton stripping fingers are mounted in parallel, spaced-apart relation along the length of a tube having its opposite ends secured to the opposite ends of a housing for the head of the apparatus. A different sensor mounted on each of the opposite ends of the array of stripper fingers varies one of a pair of valves accordingly. The valves are included in circuits coupled to a source of pressurized fluid so as to vary the pressure in respective ones of a pair of cylinders extending between opposite ends of the elongated tube of the head and a hollow, auger-containing housing mounted on a frame extending from a vehicle. The auger housing has opposite ends on which are pivotably mounted the opposite ends of the housing for the head. The cylinders respond to variations in fluid pressure as provided by the respective height sensors to vary the length thereof and thereby the distance between the associated end of the elongated tube and the auger housing. Variations in the distances result in twisting of the tube so as to twist or distort the generally planar array of stripper fingers which are mounted on the tube. Burris, et al. U.S. Pat. No. 3,927,511 discloses modifying a conventional combine harvester for the harvesting of cotton by installing a cotton stripping head on the machine platform, just as it is necessary to install a cornhead on the combine when converting the combine from a wheat harvesting to a corn harvesting operation. The stripping head takes the form of a plurality of fairly closely spaced stripping fingers which project forwardly from the front of the machine to pass beneath the cotton bolls so that two fingers are operable to pluck the boll from the main stalk as the machine is advanced across a cotton field. The fingers are mounted to extend across the entire front of the platform over a width of approximately 15 feet so that the machine is equally well adapted to the harvesting of row planted cotton or broadcast cotton or is capable of harvesting cross-wise of row planted cotton. A flail-like reel is mounted for rotation above the fingers to feed the stripped bolls rearwardly into the conventional feeder house of the combine. Bauert U.S. Pat. No. 1,368,014 discloses combs of stripper harvesters in which the teeth of the comb are adapted to have the openings between them varied to suit different crop conditions. The combs are constructed with teeth which have a fixed portion detachably secured to the comb bar and movable portion which is also detachably connected at its rear end with a reciprocable rod. At the rear of the teeth there may be fitted a sickle knife when the comb is attached to a harvesting machine in which the crop is harvested by cutting with a reciprocating knife. This type of harvester is used to harvest grain where the grain and some plant material is severed from the stalk and collected.

The above discussed patents are each incorporated herein in their entirety by this reference to them.

BRIEF DESCRIPTION OF THE INVENTION

This broadcast cotton stripper header assembly (A) (FIG. 1) of the present invention is setup into individual header units (B) (FIG. 2) as compared to conventional broadcast headers. The principal features of the broadcast cotton stripper header of the present invention include the construction of individual header units, the frame integral height control, the shape and unique curvatures of the stripper bars (cobra bars), and the unique paddle frame and chain structures. Another feature is the addition of a unique weed sickle which helps to eliminate weeds from being a nuisance in the cotton harvesting process. These features and their working relationships make the broadcast cotton stripper header of the present invention far superior to known broadcast headers.

The broadcast cotton stripper assembly (A) is attached to a cross auger frame unit (E) which is attached to a harvester tractor (C). The tractor (C) includes a driver's cab (F), an air duct (G) for moving stripped cotton from the cross auger frame unit (E), to the cotton collection basket (D).

The various units of the broadcast cotton stripper header assembly of the present invention provide many important features.

The Header

The header assembly (A) (FIGS. 1 and 2) can be made with a variable number of header units (B) (FIG. 2). The header assembly can contain 2 to 10 header units, preferably 4 to 6 header units, each of which header units can be 15 to 60, preferably 36 to 40 inches in width, depending on the capacity of the combine harvester used and the density, i.e. number of cotton plants, per unit area, of the cotton plants to be harvested. Each header unit can vary in width by increments of one and one half inches. This is important because the header width has a direct relationship with the crop production (high or low production). Also, the width of the header assembly can be fit to differing capacities of various models or brand names of stripper tractors (C) (FIG. 1).

Each unit of the header assembly is individually height controlled, which allows for varying ground levelness. The header unit frame itself including side plates (14) and stripper bars (20) is the height control mechanism (FIG. 4).

Each header unit has thin side plates (14) that divide the cotton plants into its individual width of swath (FIG. 3). The thinness of the side plates (14) allows the cotton plants to be parted into unit swaths, and thus not allowing the cotton plants (including stalks, cotton bolls, etc.) to be wiped over or smeared onto the ground.

A header assembly composed of several individual units is much stronger and more durable per unit than a single full width header of the same width. The individual header units make the construction of the header assembly much stronger and lighter in weight per unit and aggregate of units, than a single full width unit of the same total width. (FIG. 1).

Height Control System

Each unit of the header assembly is individually height controlled, which allows for varying ground levelness and condition. The individual header unit frame itself including side plates (14) and stripper bars (20) is the height controlling mechanism.

The bottom curvature (23) of the stripper bar (20) is the first component of the height control system (FIG. 6). The tip (21) of the stripper bar is held at a constant distance from the ground by a second curve, bottom curvature (23), in the stripper bar which is located behind the tip (21). This curve (23) slides on the ground. With the combined strength of, for example, 25 stripper bar curves (23) per unit (FIG. 5), entrance of the tips of the stripper bars into the ground does not occur in normal operation. The surface area of the second curve (23) of the stripper bars touching the ground is sufficient to float the whole header unit frame causing a second part of the height control mechanism (31–36) to work the stripper tractor hydraulics system (37) (FIGS. 4, 6 and 9).

The height control mechanism is comprised of an elliptical hole (31) in the side plates (14) of the header units (FIGS. 7, 8 and 9). The elliptical holes (31) in the side plates are placed over the support tubes (2) (FIGS. 8 and 9). The support tubes are attached to the unit's frame structure T-bar (1) which is attached, to the cross auger mainframe unit (E) of the stripper tractor (C). The T-bar frame structure (1) holds the header units (B) in a side by side configuration to act in unison as one complete header assembly (A) (FIGS. 1 and 2). The elliptical hole (31) allows enough travel of the unit rearward in the elliptical hole (31) over the support tube (2) to trigger the height control linkage (33–35) (FIGS. 7, 8 and 9) so that it activates the hydraulics (37) (FIGS. 4, 6 and 9) of the stripper tractor (C). When the header unit hits a bump or rough ground the header unit frame is moved in the elliptical hole (31) of the side plate, and the curved portion of the rear plate (30) pushes on the linkage roller (33) to engage the hydraulic valve powered by the stripper tractor hydraulics. This raises the header unit frame and stripper bars off the ground enough to pass over the bump or rough ground and disengage the hydraulics. Gravitational weight of the header unit drops the unit down in the elliptical hole (31), thus lowering the header unit. This repeated action provides uniform, deliberate, and certain height control while lightly maintaining contact of the header unit stripper bars with the ground. This allows little or no jumping of the stripper bar tips to miss going under a cotton boll, thereby not leaving whole cotton bolls (61) in the field (FIG. 4).

Stripper Bars

The stripper bars of the broadcast cotton stripper header are uniquely formed to accomplish several purposes.

These stripper bars (20) are formed to pass under all cotton bolls (61) hanging on the stalks (62) (FIGS. 3 and 4).

Shape (22–23) of the bars keep cotton on the bars from falling over the end (21) of the bars back onto the ground (FIG. 6). This acts as an anti-drip mechanism when the cotton stripper is stopped or the header is raised from the ground and also keeps snapping cotton from flying forward onto the ground.

The stripper bars (20) part the cotton stalks (62) and strips the cotton bolls (61) from the stalk with minimal side flexibility so that whole bolls of cotton are not left on the stalk (FIGS. 3 and 4).

The shape (22–23) of the stripper bars (20) keeps the bars from directly entering the ground to prevent damage to the bars and to the header's components (FIGS. 4 and 6).

The bars are formed to prevent the tip (21) of the bars from directly entering the ground, thereby allowing them to jump over bumps in the ground, foreign objects such as rocks, stumps or any other harmful items.

The bars (20) are formed so that they perform height control functions (FIG. 6). The shape portion (23) of the stripper bars regulates the height of the tips (21) from the ground, thereby preventing the tips (21) from entering into the ground. This provides efficient regulation of hydraulic height control. The bars (20) are formed in such a manner as to cooperate with the paddles (9) in order to facilitate the engagement of the paddles with the cotton (FIG. 4). The paddles move the cotton rearward up the incline of the bars (20), and at the same time the paddles are gradually disengaged from the cotton and release the cotton into the cross auger, not shown. The path of the paddles rearward and up the incline of the stripper bars is shown by the dotted line (25).

The stripper bars (20) are sturdily mounted to the support tube (13) of the mainframe of the unit (FIGS. 4 and 6) so they do not vary in distances apart from each other. Therefore, they do not miss whole bolls of cotton.

The top ends (24) of the stripper bars are formed in a downward curve so that they result in the disengagement of the paddles (9) with the cotton into a cross auger (not shown) in an orderly fashion (FIG. 4).

The stripper bars (20) are flat topped (FIG. 3) to allow for the loss of any contaminates such as dirt, ground-up leaves, or small stems through the spaces between the bars. The conventional broadcast headers use angle iron with the cup up, thereby feeding contaminates into the flow of cotton.

The stripper bars are mounted in such a fashion as to allow minor vertical flexibility to conform to ground unlevelness and imperfections or to pass over rocks or other objects that might otherwise harm the header units.

Paddles

The paddles (9) are mounted on a chain (8), which is carried on and rotates around a chain conveyor frame (6). The chain conveyor frame includes a front idle sprocket (27) and a rear drive sprocket (26).

The paddles (9) are made of light plate steel with two reverse bends (flexes) (9a) (FIG. 5) that form strength width wise and form a reverse cup effect that encourages the disengagement of the paddles from the cotton at the rear of the unit into a cross auger.

The paddles (9) are hinged on the chain in order to allow the perpendicular engagement of the paddle with the cotton, i.e. the paddle is parallel to the cotton stalk, at the front of the unit (FIG. 4), when the paddles first engage the cotton and is also at about the upward curve (22) of the cobra head of the stripper bars.

The paddles are controlled by natural gravity allowing a flip over at the front of the unit (FIG. 4) in order for the paddles to be about perpendicular to the stripper bars at the cotton boll engagement point.

At the cotton engagement point at the front of the unit, the paddles are held perpendicular to the chain by a combination of a chain stiffener bar (10) and a back up bar (11) (FIGS. 4 and 6). These bars allow the chain and paddle combination to wipe the stripped cotton bolls up the incline of the stripper bars (20) in a positive action and definite manner.

The chain stiffener bar (10) is a bar that is attached to the same chain link as the paddle hinges (12). When the chain (8) rotates around the front sprocket (27) of the header unit to engage the paddle with the cotton bolls, the chain stiffener bar (10) lies along the back of the chain for about the same distance or a greater distance than the radius (length) of the paddle.

The dotted line path (25) of the tip of the paddle (9) is held (controlled) by the chain conveyor with its back up bars (11) and chain stiffener bars (10) and the paddle chain frame (6). The paddles (9) are thus maintained in a position generally perpendicular to the upwardly inclined stripper bars (20). As the paddle tips move rearward up the incline (20) of the stripper bars along the dotted line (25), the distance between the tip of the paddle and the stripper bars is gradually increased so that the paddle is gradually disengaged from the cotton. This allows the cotton to be rolled down the tail end (24) of the stripper bars (cobra bars) and into a cross auger, not shown. This construction prevents the paddles from recirculating cotton over the top of the paddle chain frame (6).

The paddle behavior and line of travel relative to the stripper bars (cobra bars) is important because there is no dead or negative action area for cotton to build up and stop the flow. This construction and relationship creates a positive, aggressive, and certain cotton flow into a cross auger.

The speed of travel of the paddles is slightly slower than the ground travel rate of the machine. This ensures that the paddles are never overly aggressive in relation to the cotton stalks being stripped of the cotton bolls. Therefore, there are no thrashed cotton stalks in the cotton. The paddles, however, do become aggressive, deliberate, and certain when they are engaged with the cotton bolls and move the stripped cotton bolls rearward and upward on the inclined stripper bars.

The engagement of the paddles (9) is very deliberate and certain, yet variable to some extent depending upon the height of the cotton plant. The taller the cotton plant, the higher up the stripper bar incline the paddles become engaged into their perpendicular position to move the cotton rearward. The shorter the cotton plant, the lower on the stripper bar incline the paddles becomes engaged to move the cotton rearward.

Weed Sickle

The weed sickle (FIGS. 10–13) feature of the invention is an embodiment of the invention that is designed to reduce or eliminate the loss of productive stripping time due to the presence of weeds in the field interfering with the harvesting operation.

The weed sickle embodiment of the present invention is believed to be the first successful stripper designed to deal with the presence of weeds in the cotton crop.

The weed sickle embodiment cuts off the top of the weed and leaves the bottom base of the weed in the field.

The weed sickle embodiment eliminates weeds from being caught and building up on top of the stripper bars or between the stripper bars. A build up of the weeds may stop the efficient flow of cotton into the cross auger.

ADVANTAGES OF THE INVENTION

The versatility of the header assembly of the present invention is unmatched. The header assembly can be mounted on a cross auger of its own or mounted to an existing cross auger on many of known brand name stripper tractors (FIG. 1). The header assembly of the present invention with a cross auger (E) of its own would quickly attach to a stripper tractor (C) in the same manner as a row header cross auger attaches to the stripper tractor. This simple procedure includes disengaging two pins, two hydraulic lines, and the power drive line. The stripper tractor can then be backed away from the header cross auger unit and be attached to another header unit by the same procedure of putting in the two pins and hooking up two hydraulic lines and the power drive line, making the stripper ready for the field. However, in the interest of saving money in the investment of the cross auger unit, the existing row headers can be taken off of a conventional stripper tractor cross auger unit and the unit broadcast header of the present invention can be mounted in the place of the row header units of the existing stripper tractor.

The broadcast cotton stripper header of the present invention provides a competitive edge in the practices of growing and harvesting cotton through increased production yields while incurring constant or lower input costs. This is accomplished by enhanced utilization of inputs, such as land, water, fertilizer, weed control, and pest control. Also, less exposure to weather elements and seasonal market price changes are enabled in accordance with the invention by in some cases shortening the growing season by a month or more.

Producers that use this broadcast cotton stripper header will be able to cut harvesting costs by minimizing maintenance and repairs due to the durability (construction) of the header and its parts and to the slow speed at which the parts of the header move. There is relatively little or no down time to replace wear replacement parts, such as row header bats and brushes or bent or distorted components of the header. The construction of this header makes it very durable and easy to maintain.

The broadcast cotton stripper header of the present invention was created with the capability to be used on most or all of the present harvest machines, including old or new models, as well as most brands because the air ducts system of the stripper tractor are not changed. Further, the use of this header will usually not require changing the cross auger configuration of the stripper tractor.

The broadcast cotton stripper header of the present invention minimizes the waste of cotton bolls due to being left in the field. This has been accomplished by the creation and operation of the unique curvature of the stripper (cobra) bars, paddle-chain assembly, integral frame height control, and weed sickle. The flexibility and the spacing of the stripper (cobra) bars eliminates whole boll loss through gaps between the bars. Also, the unique curves of the stripper bars reduces loss of captured cotton by an anti-drip design. The cooperation of the stripper bars with the paddle-chain assembly reduces negative cotton flow situations in the harvesting process by capturing the cotton bolls, thereby minimizing waste. The slow speed of the paddle-chain assembly prevents loss of captured cotton bolls due to being thrown out of the header. The integral frame height control reduces jumping or digging of the header units to minimize the leaving of cotton bolls in the field by sampling 100 percent of the terrain imperfections for height control. The weed sickle reduces weed interference with cotton flow up the stripper bars, thereby enhancing harvest efficiency and minimizing waste.

The broadcast cotton stripper header of the present invention expedites harvesting broadcast cotton. The combination of the stripper (cobra) bars, paddle-chain assembly, efficient integral frame height control, and weed sickle enables the header to harvest high volumes of cotton, which utilizes a modern stripper tractor's high capacity capabilities.

The broadcast cotton stripper header of the present invention obtains a clean high quality harvest. The flat top of the stripper (cobra) bar accomplishes a clean harvest by dropping contaminants, such as dirt, leaves, stems, or other foreign matter in the seed cotton, through the gaps of the stripper (cobra) bars. The slow speed at which the paddle-chain assembly moves prevents thrashing of the cotton stalks, which reduces the amount of bark in the seed cotton. Also, the non-invasive entrance of the flip paddle into the cotton maintains the integrity of the whole cotton boll without being mixed with foreign matter. The integral frame height control prevents the header from digging into the ground, thereby minimizing the collection of dirt and rocks with the seed cotton. The weed sickle insures a steady and positive flow of cotton up the stripper (cobra) bars and into the cross auger, thereby preventing unnecessary mixing and thrashing of seed cotton with foreign material.

The broadcast cotton stripper header of the present invention provides simple construction, durability and long life. The unique shape of the stripper (cobra) bars provides strength and minimal movement from side to side. The flex and reverse flex in the paddles, as well as the unit width, provide durability and strength. The slow speed of the paddle-chain assembly and the weed sickle insures long life simply by preventing wear of the moving parts, thus minimizing repair. The durability and long life of this broadcast cotton stripper header enables an operator that is capable of steering a stripper tractor to efficiently utilize this header.

A further advantage of the header assembly of the present invention is that in operation, it is significantly quieter than conventional row cotton header machines and conventional broadcast cotton header machines.

The header assembly of the present invention includes and combines the novel features of division of the header assembly into individual units, the shape and use of the stripper (cobra) bars, paddle-chain assembly with the flip paddle, integrated frame height control, and weed sickle in the harvesting of broadcast cotton.

Other advantages of the cotton stripper header assembly will become readily apparent by the following description of the invention.

BRIEF DESCRIPTION OF THE DRAWINGS

FIG. 1 is a perspective view of the cotton stripper header assembly (A) having four stripper header units attached to a cross auger unit (E) and to a cotton stripper tractor (C).

FIG. 2 is a ground level front view of the cotton stripper having four stripper header units.

FIG. 5 is a ground level front view of a single cotton stripper header unit similar to that of FIG. 3, which is shown for clarity without the cotton being harvested.

FIG. 6 is a cross-section view of a single cotton stripper header unit similar to that of FIG. 4, taken along line 6—6 of FIG. 5, which is shown for clarity without the cotton being harvested.

Figure 3:
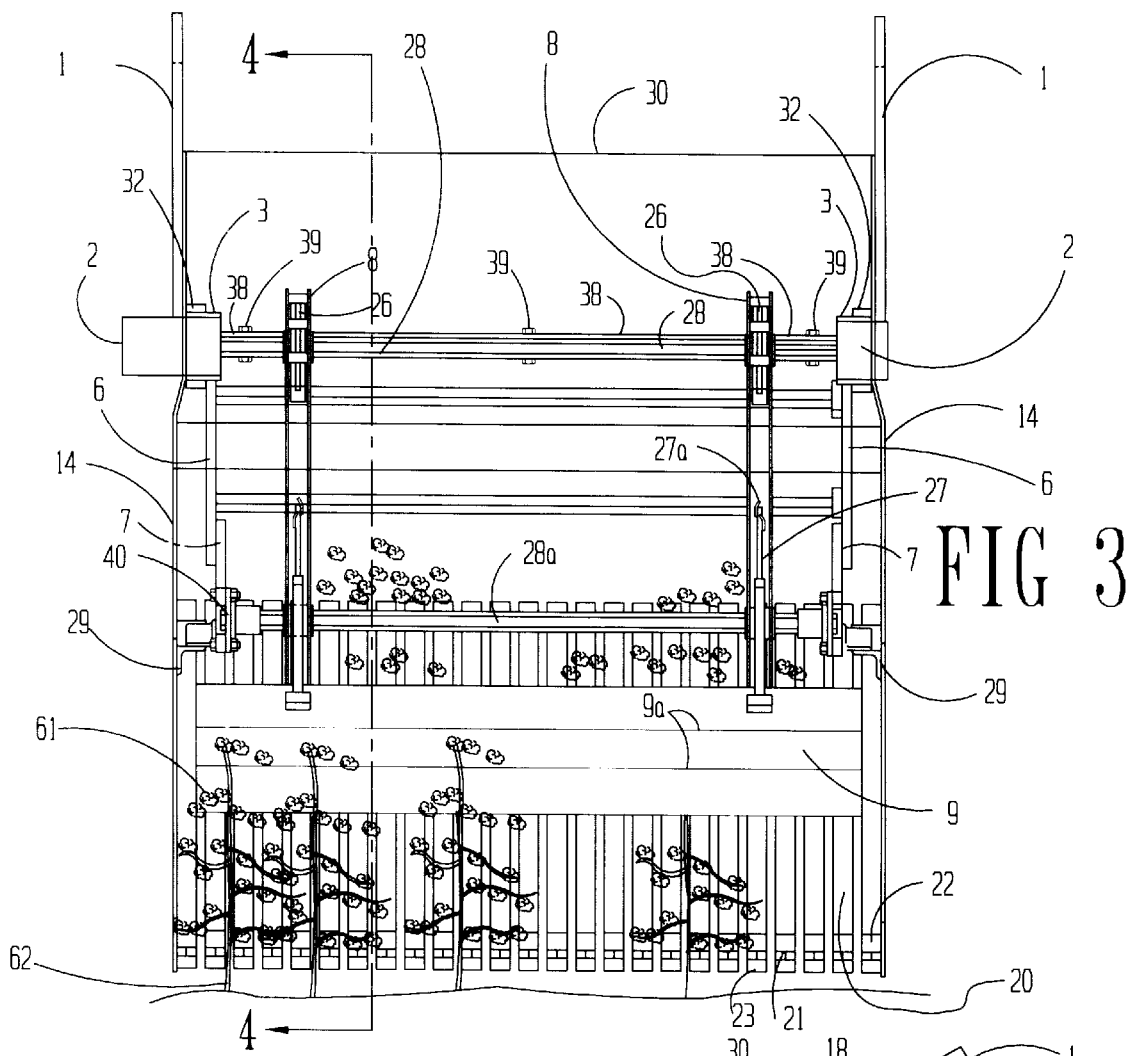
FIG. 3 is a ground level front view of a single cotton stripper header unit showing cotton plants and cotton as it is stripped from the cotton plants.

FIG. 7 is an enlarged ground level front view of a portion of FIG. 5 taken through a vertical section of the sideplate (14), bearing support tube (2) and support T-bar (1) of the cotton stripper header, and also showing support tube (18) and related components.

FIG. 8 is an expanded side view of portions of the height control system of FIG. 9 showing the relationship between the side wall (14), the support T-bar (1), the horseshoe guide (32), the bearing support tube (2), drive shaft (28), chain frame hinge tube (3) and the paddle chain frame (6).

FIG. 9 is an enlarged partially cut-away side view of the back portion of FIG. 6 showing the cotton stripper header unit height control activating components.

FIG. 10 is an enlarged top view of the weed sickle embodiment of the present invention.

FIG. 11 is an illustration of the components of the weed sickle and the drive system used to operate the weed sickle.

FIG. 12 is an enlarged front view of a cross-section of a portion of the weed sickle of FIG. 11 taken directly facing the stripper bars (20).

Figure 13:
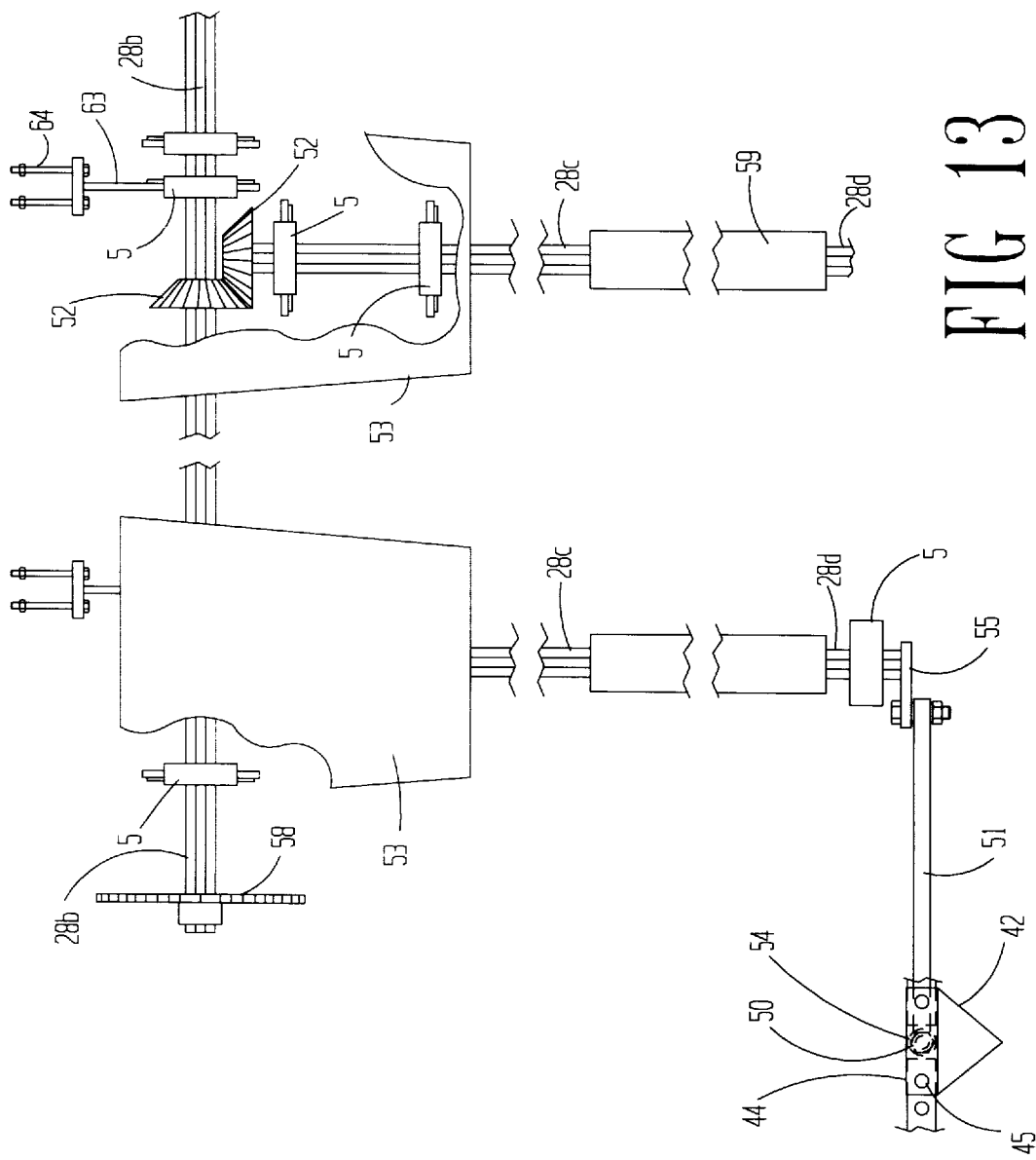

FIG. 13 is a top view of the weed sickle drive mechanism.

DETAILED DESCRIPTION OF THE INVENTION

The present invention will now be discussed with reference to the figures of the drawings.

FIG. 1

FIG. 1 is an illustration of the broadcast header assembly (A) of the present invention with multiple individual header units (B) and a cotton stripper tractor (C). The number of header units per header assembly may vary depending upon the situation of needs. Normally, the number of units ranges from four units per header to six or eight units per header. The cotton handling capacity of the stripper tractor (C) usually determines the number of units required to complete one header assembly. The older stripper tractors have less cotton handling capacity; therefore, they would require fewer units to complete a header assembly. Later model tractor machines have a higher cotton handling capacity, therefore, they require more units per header assembly to supply their harvesting capacity. The cotton stripper tractor (C) in FIG. 1 represents a conventional late model and brand of stripper tractor that has a quick attach header cross auger unit (E). A suitable cotton stripper tractor (C) uses a cross auger unit (E) to deliver cotton to air ducts. (G) which delivers the cotton to a cotton collection basket (D).

FIG. 2

FIG. 2 is an illustration of a ground level front view of the header units (B) arranged side by side to form one complete header assembly (A). This ground level front view shows each header unit's general configuration of side plates (14), stripper bars (20) (cobra bars), chain (8) and paddle assemblies (9), and the axial pivot point of the units (B) on the main power shaft (28) from the hydraulic orbit motor (41). The drawing also shows drive sprocket (56) for the orbit motor, drive chain (56a) and drive sprocket (58). The FIG. 2 illustrates four header units (B), but other combinations such as six or eight header units can be used as well, depending on the cotton handling capacity of the cotton harvester.

FIG. 3

Figure 4:
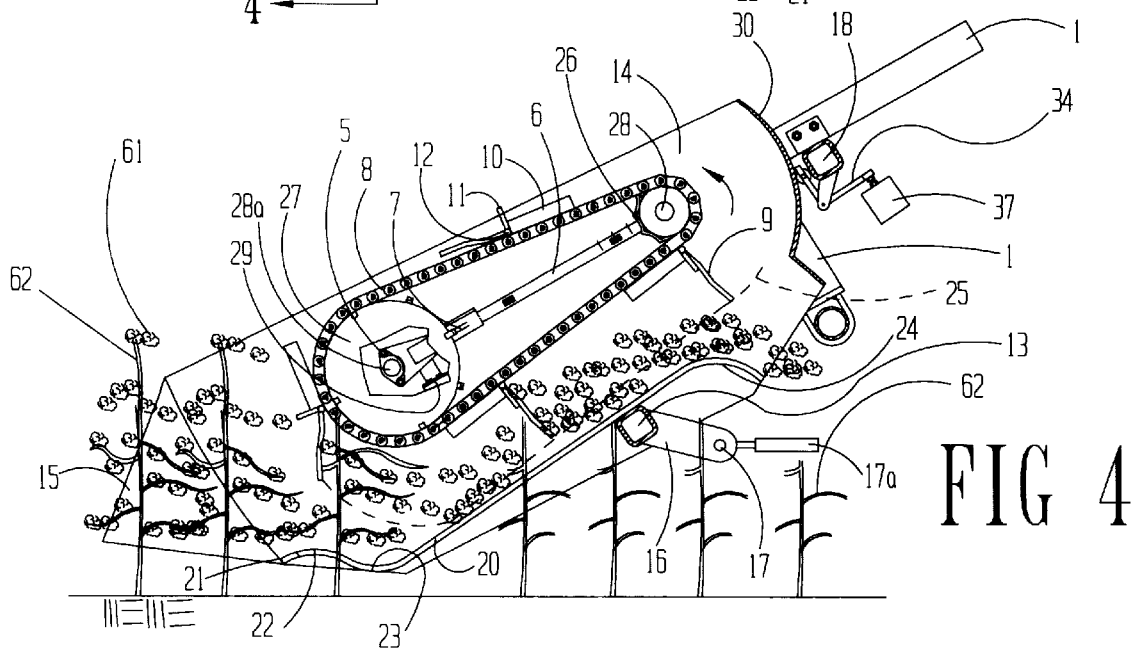
FIG. 4 is a cross-section view of the cotton stripper header unit of FIG. 3 taken through line 4—4 of FIG. 3 which shows the stripping of cotton from the cotton plants, the moving of the cotton bolls upwardly on the inclined stripper bars and the movement of the stripped cotton bolls off of the stripper bars and out of the stripper header unit.

FIG. 3 is a ground level front view of a single header unit (B) that shows the harvesting process of cotton bolls through the header unit from the beginning to the end. This figure illustrates how the stripping process begins as the header comes into contact with the cotton plants (62) with mature cotton bolls (61) and the path of the stripped cotton bolls (61) as they travel through the header until they enter the cross auger unit (E) of the stripper tractor where they are then delivered to the tractor cotton collection basket (D) (FIG. 1). The support T-bar (1) and support tube (2) are welded together and the rearward arm of the T-bar is attached to the stripper tractor cross auger unit to provide support for the header assembly. The support tube (2) houses a bearing that the unit drive shaft (28) goes through. The drive shaft (28) acts as the power shaft for all of the header units in unison. Two sprockets (26) per header unit, located on the drive (power) shaft (28), are spaced between the support tubes (2). The support tubes (2) are located on each side of the header unit. The power shaft (28) turns the sprocket (26), which in turn rolls the chain (8) that has four paddles (9) each attached by a hinge (12) (FIG. 4), around the two paddle frame members (6). Looking at a side view of the stripper header from the side opposite to the orbit motor (41), the orbit motor turns the unit drive shaft (28) counterclockwise, as shown in FIG. 4. Therefore, the chains and paddles travel around the paddle frame (6) in a counterclockwise motion when looking at FIG. 4, that is, the left side of the header while sitting in the operator's cab seat (F) . The unit side plates (14), stripper bars (20), horseshoe guide (32), unit support tube (13) (FIG. 4), and paddle chain frame (6) lower limit block (29) are all welded together to form a structural unit from which all other parts can be attached. There are two-unit side plates (14) per unit, one located on each side of the unit. The stripper bars (20) have unique curves at the top and bottom that enable them to perform their functions. The horseshoe guide (32) is a half circle (horseshoe) of metal welded to the side plate (14) to act as a stop block reinforcement. This reinforcement prevents wear of the unit side plate (14) into the support tube (2). The horseshoe guide (32) rests around a hinge tube (3), which is the hinge tube for the paddle chain frame (6). The hinge tube (3) is welded to the paddle chain frame (6) and is secured to the paddle chain frame (6). The hinge tube (3) is a tube that fits snugly over the support tubes (2) on each side of the unit. The paddle chain frame limit block (29) is a block welded to the side plates (14) to prevent the chains (8) and chain frame (6) from allowing the paddles (9) to engage or rub the stripper bars (20). The limit block (29) maintains about an inch of clearance between the tip of the paddle (9) and the stripper bars (20) at the front lower end of the unit. This clearance increases progressively as the paddles (9) travel up the incline of the stripper bars (depicted by FIG. 4 dotted line No. 25) to allow gradual disengagement of the paddles from the cotton as the cotton is pushed over the upper end (24) of the stripper bars.

FIG. 4

FIG. 4 is a schematic illustration of a side view of a header unit taken through lines 4–4 of FIG. 3 which is in the process of harvesting cotton bolls (61) from the stalks (62). The purpose of this figure is to demonstrate the stages of the. stripping and harvesting process and the relationship and interaction of the various components to one another during the stripping process. The cotton stalk (62) shown at the left of FIG. 4 illustrates the plant with attached mature cotton bolls (61) before entering the stripping process. The cotton stalk (62) under and behind the header unit (to the right of the unit) shows a cotton stalk (62) without attached cotton bolls (61) after going through the stripping process. The header unit cotton stalk dividing horn (15) is a plant divider that parts the cotton plants (62) into swaths or paths that are the same width as the side plates (14) of the individual header units (B) (FIG. 2). As the header unit moves forward to come in contact with the cotton crop, the stripper bars (20) slide lightly on the ground. The stripper bars' tips (21) slide under the bottom of the cotton bolls (61) on the cotton stalks (62) as the cotton stalks enter the gaps between the stripper bars (20). With further forward motion of the header unit, the cotton bolls are stripped from their parent cotton stalks (62) due to the gap between the stripper bars (20) being less than the size of the cotton boll (61). However, the gaps between the stripper bars are wide enough to allow complete passage of the cotton stalks (62) in order to allow the severance of the cotton bolls (61) from their parent stalks. The stripping process begins at the front lower end of the straight part of the stripper bars (20). The configuration of this area of the stripper header of the present invention is very effective, compared to previous stripper designs, for efficiently removing cotton bolls (61) from cotton stalks (62). Nothing is left to chance for the stripping process to continue. The paddle (9) begins to engage with the first severed cotton bolls (61) to force the travel of the cotton bolls (61) up the incline of the stripper bars (20). Further forward motion of the header unit, i.e. the stripper tractor, severs more cotton bolls (61) from the stalks (62) as the cotton stalks travel between, rearward and up the incline of the stripper bars (20). The stripped cotton bolls move up the inclined stripper bars due to the forced raking action of the paddles (9). As the cotton stalks travel between, rearward and up the incline of the stripper bars (20), the higher cotton bolls (61) on the cotton stalks (62), i.e. the cotton bolls further from the ground, are separated from the stalk. When the stalks are cleaned of all their bolls, the stalks pull through the gaps of the stripper bars and flip out under and behind the stripper unit, leaving nothing but a bare stalk. As the tips of the stalks are leaving the engagement of the stripper bar gaps, only cotton bolls are left on top of the stripper bars. The paddles (9) are in the process of finishing their work travel to dump the severed cotton bolls into the cross auger frame unit (E) (FIG. 1) of the stripper tractor. The distance of the tip of the paddle (9) in relation to the stripper bars (20) is gradually and purposely increased to insure the definite and orderly release of the paddle (9) engagement with the cotton bolls (61). The dotted line (25) shows the travel of the paddle and the decreased engagement relative to the stripper bars (20) and cotton bolls (61). As the paddles travel around and over the rear drive sprocket (26), gravity flips the paddle on hinge (12) forward 90 degrees so that the paddles lie flat on the chain (8) (FIGS. 3 and 4), i.e. parallel to the chain. This allows the paddle (9) to be in position to enter the cotton stripping process in a vertical stance, i.e. parallel to the cotton stalks as the paddles travel around the front idler sprocket (27). If the paddles were held perpendicular to the chain at all times, the paddles would enter the cotton stripping process at the front of the header with a slapping and thrashing action. The slapping and thrashing action would result in foreign stalk material in the lint cotton after it is ginned. The added foreign stalk material would significantly reduce the value of the ginned cotton when it is sold. Also, the paddles are hinged in order to allow the engagement with cotton bolls on taller stalks to be higher up on the stripper bars so that there is less of an invasive trash making action. Tall cotton stalks by nature will push the cotton bolls higher up the stripper bars because of their strength and height. The tall cotton stalks will to some extent tend to float the paddle (9) rearward in a direction parallel to the bottom of the chain as the header unit moves forward. As the tall cotton stalks pull through the gaps between the stripper bars, the paddles are released (not floated or held by the taller stalk parallel to the bottom of the chain any longer) to engage with only severed cotton bolls at the middle to upper portion of the stripper bars. The flotation of the paddles is accomplished by the fact that the stalks are moving through the gaps of the stripper bars slightly faster than the paddles are traveling. The chains and paddles are moving at a slightly slower speed than the ground travel of the header unit, i.e. the broadcast cotton stripper tractor. This action is very versatile and unique with respect to differing heights of cotton plants in any given field. The variability of the paddle engagement with the cotton is an important feature of the present invention. Because of the non-invasive and non-thrashing effect on the cotton stalks that is achieved, trash and foreign plant material in the stripped cotton bolls is kept at a minimum. The variable paddle engagement with the cotton stalks is one of the features of this machine that increases the value of the harvested crop because of less trash material in the cotton. Trash material contained in the cotton hauled to the gin will result in a low sale price for the cotton. Clean cotton taken to the gin will result in higher sale price for the cotton. Lower grade cotton stripped by conventional broadcast headers has been a principal consideration that has deterred the adoption of the broadcast cotton method of farming and harvesting cotton. Accordingly, in the present invention, the interaction of the paddles with the cotton stalks, cotton bolls, and the stripper bars (cobra bars) is an important feature of the broadcast stripper header. The speed of the paddle travel is maintained slightly less than the ground travel speed of the header unit. The speed of travel of the paddles is purposely slower than that of the header unit ground speed to reduce the possibility of the paddles becoming overly aggressive when contacting the cotton and stalks which causes unnecessary and unwanted stalk or plant material to contaminate the harvested cotton. Another important feature of the present invention is that both tall and short cotton plants can be harvested with relative ease. Other components in FIG. 4 will be discussed in subsequent figure descriptions.

FIGS. 5 & 6

FIGS. 5 & 6 which are related will be described together. FIG. 5 is a ground level front view of a stripper header unit. FIG. 6 is a cross section of FIG. 5 taken along line 6—6. Number T-bar (1) is two pieces of flat steel bar welded to form a disfigured T (see also FIG. 9). The T-bar (1) has a plate (19a) welded on the bottom of the upright portion for the purpose of accepting the U-bolts (19) that attach the T-bar (1) to the support tube (19b) (FIG. 6) of the cross auger frame unit (E) of the stripper tractor (C) (FIG. 1). The upper most end of the T-cross bar is clamped to the upper framework of the cross auger frame unit (E) of the stripper tractor. Just behind the stripper units is a transverse square tube (18) that is bolted to each of the T-cross bars. This has two purposes. First, it helps to maintain the rigidity of the header assembly as a whole. Second, it provides a structure on which to mount the individual header units height control lever mechanisms (33) to (36). The height control mechanisms include a lever bracket (36), a roller (33), lever (34), adjusting screw (35), and the hydraulic valve box (37) of the stripper tractor. The lever brackets (36) are welded to the square tube (18). The roller (33) and the adjusting screw (35) are both components of the lever (34). The roller (33) rolls on the back of the rear curved structural plate (30) which is welded to the side plate (14). The rear curved structural plate (30) is a radius of the oblong hole (31) in the side plate (14) (FIG. 8), thereby providing an excellent sensing surface no matter whether the front lower end of the header unit is in a raised or lowered position. As the stripper bars (20) slide lightly on and along level ground, the unit weight is transferred to the ground at the lower curve (23) instead of to the support tube (2). When the lower curve (23) encounters unlevel or rough ground, this causes the header unit to slide upward and rearward in the oblong hole (31) in the header unit side plate (14). The distance of movement is very small, for example, about ⅜ to ¾ inch. This action results in moving the curved back plate (30) rearward against roller (33) and increasing the distance between the axial line of the support tube (2) and the roller (33). This movement and shift of weight pushes on the roller (33) while the lever (34) transfers the signal to the stripper hydraulic valve box (37) which activates hydraulic lift cylinder (17a) to move the unit lift arm (16) to raise the header unit. Each header unit is individually controlled. When the header unit has been raised sufficiently, e.g. ½ to 12 inches, depending on the height of an obstruction, to transfer weight back to the support tube (2) (relieved weight on the ground at curve (23) of the stripper bars), and to have the header unit pass over the unlevel or rough ground pressure on the roller (33) is relieved (the unit weight is transferred back to the horseshoe (32) resting on the hinge tube (3) that is over the support tube (2), which holds the weight of the unit), and the hydraulics allow the unit to drop back to the ground. This action of raising and lowering the header unit is constantly repeated as the stripper bar curve (23) moves over the ground and encounters any resistance, such that the stripper bar curve (23) only lightly touches the ground. This use of the herein described integral frame height sensing system eliminates the need for ground sensing shoes and signal rods that are high maintenance components with regard to repair and adjustment and are mounted with difficulty in each unit and allows for sampling of only a small part of the ground. Applicant's integral frame height sensing unit is a novel concept of height control that is unique to the described header units and allows for sampling of all of the ground over which the header unit passes. The lower and forward most end of the T-cross bar is welded to a support tube (2) (see FIGS. 7 and 8). The T-bar (1) and the tube (2) form one piece after they are welded together, and provide the unit carrying structure for the various other components. There are three parts of the cross T-bar structures. The T-structures that hold the end units of the header have a right-hand and left-hand configuration (FIGS. 8 and 9). The tube (2) protrudes only to one direction (right or left depending on which end of the header it is on) in order to support its components. The T-structures at junctions of the units have a protruding tube, (2) on both sides in order to hold components of adjoining units. The T-structures, including the welded on tube (2), are built with exact dimensions relative to the line bore of the tubes' (2) axial line when installed. The attachment of all the T-structures (1) to the cross auger frame unit (E) (see also FIG. 1), provides a straight axial line for the paddle drive shaft (28) and supports the units from the same axial line. The support tubes (2) have three functions. First, they house a bearing (4) inside for the rotations of the paddle drive shaft (28) to be on an axial line. Second, they provide a structure support for the sides of the unit (14). Third, they provide a mounting structure for the paddle chain frame hinge tube (3). The paddle chain frame (6) consists of bar metal welded together to form a rigid structure that supports the lower idler shaft bearings (5) and idler sprockets (27) on a one-inch hex shaft. The paddle chain frame is made so that the bolted slide joint (7) is separate from the main frame (6), for necessity of adjustment, assembly, repairs, and/or maintenance. The paddle chain frame (6) is welded to the chain frame hinge tube (3) for an axial hinge support from the paddle and chain drive shaft (28). The opposing side paddle chain frame (6) is likewise welded to the chain frame hinge tube (3) to provide the opposing side of the paddle chain frame. The paddle chain frame hinge tubes (3) fit over the main support tube (2) (after the unit side plates (14) with horseshoe guides (32) have been installed) in order to provide the chain and paddle components with an axial power shaft (paddle drive shaft (28) and sprockets (26) at the axial hinge point). The axial hinge point of paddle drive shaft (28) provides the pivot point when the header unit is raised or lowered to adjust the distance above the ground of the curved portion (23) of the stripper bars. Adjustment of the chains length is allowed by bolted slide joints (7) located on each side of the paddle chain frame (6). The lower end of the paddle chain frame (6) and bolted slide joint (7) is supported by a block (29) that is welded to the inside of the unit side plate (14). The block (29) sets a limit on how far the paddle chain frame may drop in the unit. The limit block (29) prevents the paddles (9) from touching or rubbing the stripper bars (20), and maintains the paddle tip travel rearward shown by the dotted line number (25). The paddles (9) are made of sheet metal that is cut to size and reverse flexed (9a) for width-wise strength. The paddle has a small pipe welded to it so that a rod can be inserted to form a hinge (12). The other part of the hinge is welded to both of the chains (8) in combination with the paddle chain stiffener (10) and the paddle back up bar (11) at four intervals of the chain in order to provide four paddle attachment places on each set of chains (see also FIG. 9). The chain stiffener arm (10) can be about the same or longer than the radius of the paddle (9). This provides enough stability (rigidity) of the chain to hold the paddle in a perpendicular position to the chain (8) while pushing the stripped cotton bolls rearward and up the inclined portion of the stripper bars (20). The idler sprocket (27) is made of plate steel with a one-inch hex bore hub welded in the center. The idler sprocket (27) has eight spike teeth (27a) welded to the perimeter of the sprocket on alternating sides of the plate to provide chain (8) guidance and to insure that the sprockets roll with the chain. The lower idler shaft (28a) is mounted on both ends by a bearing (5) in a bolt-on flange (40) that are bolted to the paddle chain frame (6) and bolt slide joint (7). The header unit structure is comprised of side plates (14), a rear curved structural back plate (30), stripper bars (20), and a unit support tube (13). The unit support tube (13) is the backbone of the header unit's structure. The unit lift arms (16) are welded transversely midway underneath the unit support tube (13). These unit lift arms (16) have lift cylinder pinholes (17) drilled in them to which is attached a hydraulic lift cylinder (17a). The unit side plates (14) and the stripper bars (20) are welded to the unit support tube (13) to form a one-piece unit. The rear curved structural back plate (30) is welded to the rear-curved portion of the side plates (14). The rear-curved portion of the side plates (14) that back plate (30) is welded to are cut on an arc that centers in the rearward portion of the oblong hole (31) (FIG. 8) in the side plates (14). The front of the side plates (14) are cut on an arc from the same reference point in the oblong hole (31) (FIGS. 8–9). This arc, located at the front of the header unit, is where the unit cotton stalk dividing horn (15) is welded as needed. The unit cotton stalk dividing horn (15) is welded to both unit side plates (14) on the header's left first unit from the cotton stripper tractor driver's view. Each unit to the right only has the unit cotton stalk dividing horn (15) welded to the right hand unit side plate (14). All of the side plates (14) have a horseshoe guide (32) for the oblong hole (31) (FIGS. 8–9), in the unit side plate (14), that is welded on the inside (stripper bar side) of the unit side plate. The purpose of the horseshoe (32) (FIGS. 8–9) is to prevent wear of the side plate (14) into the support tube (2) because of the height sensing movement or motion of the side plate (14) against the support tube (2). The horseshoe (32) saddles out on the paddle frame hinge tube (3) that fits over the support tube (2). Also, welded to the inside of the unit side plates (14) is the previously mentioned paddle chain frame lower limit block (29).

The shape of the stripper bars is novel and they perform their functions with perfection and durability. At the lower front end of the stripper bars (20) are two reverse curves that are specially designed to get under cotton bolls, provide height control functions, and provide protection and durability of the stripper bars at the same time. The bars are made from one-half by one-inch bar steel, the wider one-inch part being parallel to the ground. The tip (21) is beveled from the one-inch measurement to a point. From the tip (21) is a slight upward curve (22) that curves back toward the ground and turns into a reverse curve (23) that continues on upward into the straight portion of the stripper bar (20). The tip (21) of the stripper bar is approximately thirty-three inches of bar length from the unit support tube (13). The two reverse curves in the stripper bar together amount to about fourteen inches of the bar length. The purpose of the bevelled tip (21) is to part the cotton stalks at the ground and to guide the cotton stalks on their journey up the gaps between the stripper bars (20). The purpose of the curve (22) in the stripper bar is to give the cotton bolls an initial little lift, especially if the cotton bolls should be on a small branch. This insures that all of the cotton bolls are captured in the stripping process and none are left on the ground or on the stalk. Also, the purpose of curve (22) is to allow a small rise in the stripper bar in front of the curve at (23). The curve (23) in the stripper bar has several purposes. First, this curve (23) allows a rise (22) that is located in front of curve (23) on top of the stripper bar to act as an anti drip insurance. The curve (22) prevents cotton bolls from rolling off in front of the header unit onto the ground and being lost due to the cotton stripper stopping forward motion, raising the header, or from snapping cotton bolls from the stalks during the stripping process. Second, the curve (23) provides an excellent curved footing on the ground to provide effective height control sensing. The combined curved surface area (23) of the stripper bars on each unit allows a good smooth surface to slide on the ground and facilitate the working of the height control mechanism. Third, the curve (23) provides protection of the stripper bars and other header components by making it very difficult during the operation of the stripper header unit to dig the tips of the stripper bars into the ground resulting in damage to the header units. The stripper bars and the header unit are strong enough to spin the stripper tractor wheels into the ground without damage to the stripper bars. The last curve of the stripper bars is the tail portion (24) at the rear of the stripper unit which curves down to discharge the stripped cotton from the unit into a cross auger frame unit (E) (FIG. 1). "Cobra bars" has been previously used several times in parenthesis because the stripper bars resemble a cobra snake. The tip (21) resembles the head. The curve (22) resembles the neck and hood. The curve (23) resembles the body raising the head. The straight portion resembles the snake on the ground with a curved tail (24). The curve (24) allows the cotton bolls in the process of disengaging with the paddle (9) to roll off into the cross auger frame unit (E) (FIG. 1) in a very uniform and positive manner. The sprocket and bearing spacers (38) are bolted (39) to the shafts (28) between components on the shafts to prevent lateral movement of any component on the shaft.

FIGS. 7, 8 & 9

FIGS. 7, 8, and 9 are related figures and will be discussed together. FIG. 7 is a top view of the support tube (2) and associated parts. FIG. 8 is an enlarged expanded side view of the T-bar cross support (1) and support tube (2) and its components. FIG. 9 is a cross section of the rear portion of the header unit and height control apparatus unit. It is viewed as a unit cut in the middle of the header unit and viewed from the cut side. These figures show the structure of the axial support of the header unit frame components (14) and (32), the paddle chain assembly, and the components (3) and (6) over the support tube (2) with the paddle chain drive shaft (28) mounted inside the support tube (2), all with a common axial line. The purpose of the support tube (2) is to provide an axial line for the paddle drive shaft (28), paddle chain frame, and the height control capabilities of the integral unit frame height control. The frame containing the support tube is formed by welding two pieces of flat steel (1) to form a T, with the cross bar welded considerably off center to the up-right part of the T. The support tube (2) is welded to the short end of the cross bar of the T. The cross T-bar (1) is perpendicular to the support tube (2). The unit side plate (14), with horseshoe (32) appropriately welded to the unit side plate (14), is installed over the support tube (2). The unit side plates (14) touch the adjacent arms (1) (cross bar and up right of the T) of the T-support. Next, the paddle frame hinge tube (3) is slipped over the support tube (2). The outside diameter (OD) of the paddle frame hinge tube (3) is larger than the non-elongated dimension of the oblong hole (31) in the unit side plate (14). Therefore, the paddle frame hinge tube (3) locks the unit side plate (14) into position transversely on the support tube (2) (shown in FIG. 7). The motion of the unit side plate (14) in relation to the support tube (2) is limited from rest position, (with horseshoe (32) saddled on hinge tube (3)), to a position in which the unit side plate (14) rises to position the support tube (2) in the front part of the oblong hole (31). This motion allows the header unit rear curved structural back plate (30) (See also FIGS. 5 & 6) to press on the height control roller (33) for height control. Another motion is limited to a hinge action during which the header unit side plate (14) rotates upward a short distance around the support tube (2) and shaft (28). This is a rotation within the oblong hole (31) of the header unit frame side plate (14) and the paddle frame (6) hinge tube (3) around the support tube (2) a few degrees which is necessary for the height control functions. The header unit frame side plate (14) and paddle chain frame hinge tube (3) hinge as one unit because the paddle chain frame rests at its lower end on the limit block (29) (FIGS. 5–6). The limit block (29) is part of the header unit main frame side plate (14). The support tube (2) also allows rotation of the paddle drive shaft (28) on the same axial line that the header unit frame and paddle frame hinges on. Sprocket and bearing spacer bars (38) are cut to appropriate lengths and are bolted (39) to the shafts (28) to keep bearings and sprockets from lateral movement on the shafts (28). The structure square tube (18) provides additional transverse stability of the header units as a whole.

FIG. 10

FIG. 10 is an enlarged top view of the weed sickle illustrating the sickle sections (42), the sharp edged sickle serrations (43) and the sickle bar (44). The sickle sections (42) are attached to the sickle bar (44) by rivets (45). The block (48) with the threaded hole (49) is welded to the sickle bar (44) to act as a drive mechanism.

FIGS. 11, 12 & 13

FIGS. 11, 12 and 13 show components of the weed sickle embodiment of the present invention and its associated drive components. As viewed from the driver's cab (F), the weed sickle drive begins at the orbit motor (41) on the right hand end of the header assembly (A) (FIGS. 1–2). The drive sprocket (56) is welded to a coupler that is mounted between the orbit motor (41) power output shaft and the paddle chain drive shaft (28). Power is transferred through a chain or belt (56a) to the sprocket (58) on the weed sickle drive shaft (28b). The paddle chain drive shaft (28) and the weed sickle drive shaft (28b) are both driven by the orbit motor (41). The weed sickle drive shaft (28b) acts as the axial line for the mounting of the weed sickle bevel gear structures (53). Each unit of the header will have a weed sickle bevel gear structure (53) to drive the weed sickle components (42–46) under the individual header unit. The sickle drive housing structure mounting bracket (63) is attached to the front of the cross auger frame unit (E) by bolts (64). This mounting bracket has a bearing (5) on the opposite end of the mounting bracket (63). The bearing (5) on the mounting bracket (63) forms the axial line for the mounting of the bevel gear housing structures (53). Each bevel gear housing structure (53) has four bearings (5) to hold the alignment of the bevel gears (52) two bearings (5) on the axial line input power shaft (28b) and two bearings (5) on the output power shaft (28c). Each bearing (5) is mounted to its structure by the use of flanges (57) (FIG. 11). Power is transferred from the axial lined input shaft (28b) through the bevel gears (52) to the output shaft (28c), thus to the drive line slip joint (59). The driveline slip joint (59) drives the radius pitman arm lever (55). There is a bearing (5) mounted on the drive line slip joint shaft between the slip joint and the pitman arm lever (55). This bearing (5) provides front support for the sickle drive. The bearing (5) is attached to the bottom of the unit support tube (13) (FIG. 11). The bearing attachment is a flexible joint (65) that allows the header units to individually be raised and lowered during height control functions. The drive line slip joint (59) is necessary for the raising and lowering of the header unit during height control functions because that drive line has to lengthen and shorten in the process. The radius pitman arm lever (55) rotates on its drive shaft axis. The rotation of the radius arm lever (55) gives the sickle pitman arm (51) a side to side (transverse) motion of three inches from travel limit one way to travel limit the other way. Therefore, the bolt (54) that attaches the sickle pitman arm (51) to the radius pitman arm lever (55) is centered at 1½ inch from the axis of rotation of the radius pitman arm lever (55). The sickle pitman arm (51) is bolted (50) to the sickle bar (44) at a block (48) that is welded to the sickle bar (44). The same three-inch transverse movement of the sickle pitman arm (51) is transferred to the weed sickle components (42–46). The side to side three-inch travel of the sickle (42–46) allows the sharp edges (43) of the sickle sections (42) to shear anything that travels up the gap between the stripper bars (20) into the transverse path of the sickle section (42). The sickle sections (42) have a sharp beveled serrated edge (43) on two edges of the section (42). A flat side of the sickle section (42) rubs close under the stripper bars (20) for a scissors action. The sickle is mounted under the stripper bars (20) and in front of the unit support tube (13). The weed sickle includes the following parts: sickle bar (44), sickle section (42), sickle section to bar rivet (45), and weld on block (48). The sickle bar (44) is a thin narrow bar with holes drilled at intervals for the purpose of attaching the sickle sections (42) to the bar with rivets (45). The sickle is held in place under the stripper bars (20) by a clip (46) that is bolted (47) to the front of the unit support tube (13). The sickle clip (46) only allows side to side motion under the stripper bars (20). At a right angle to the bottom of the stripper bars and under the tip of the sickle sections, a pipe (60) is mounted from unit side plate (14) to unit side plate (14) of each unit. The purpose of this pipe (60) is to keep tall cotton stalks from entering the path of the weed sickle that would cut stalk material, resulting in trash contaminated cotton. The weed sickle cuts a weed pulled by its roots, a very tall and limber weed, or tall grass. The weed sickle sections are disposed on three inch centers on the sickle bar and extend across the bottom of the stripper bars such that all the gaps between the stripper bars are covered to allow the three inch lateral motion of the sickle sections to cut anything in their domain of transverse, i.e. lateral travel.

Detailed Description of Stripper Bars

The stripper bar (20) will be described in more detail with reference to FIG. 6 of the drawings.

The stripper bar (20) can be made from steel strip ½ to 1 inch thick, preferably about ½ inch thick. The stripper bar width can be ¾ to 1½ inches in width, preferably about 1 inch in width. The width portion of the stripper bar faces the ground. The tip (21) is beveled to a point having at the point an angle of 30° to 90°, preferably about 60°.

The distance between the stripper bars (20) can be ¼ to ¾ inches, preferably about ½ inch.

The distance between the point (21) and the point (23a) on the front of the stripper bar can be 12 to 16 inches, preferably about 14 inches.

The individual header units are about 15 to 60, preferably 36 to 40 inches wide and contain, for example, about 25–28 stripper bars that are 1 inch wide and spaced ½ inch apart.

The reverse curves 22 and 23 can be about equal in length and can be curves drawn on a radius of 6 to 10 inches; preferably about 8 inches. The curves can be the same length or one can be longer or smaller than the other.

The distance of the straight portion of the stripper bar (20) between the points (23a) and (24a) can be 18 to 26 inches, preferably about 22 inches. The distance between point (23a) to the mid point in the support bar (13) can be 16 to 23 inches, preferably about 19 inches. The distance between the support bar (13) and the point (24a) can be 1 to 6 inches, preferably about 3 inches. The distance between point (24a) and the end of the stripper bar point (24b) can be 8 to 13 inches, preferably about 10.5 inches. The curve of the end portion (24) can be drawn on a radius of a circle 6 to 10 inches, preferably about 8 inches.

The stripper bar (20) straight portion is disposed at an angle relative to the ground of 35 to 45°, preferably about 40°.

The stripper bars can be made, for example, from high carbon steel bar, and specifically from mild steel bar.

The stripper bars are very strong and relatively rigid, although they retain a sufficient amount of flexibility to allow cotton stalks of slightly more thickness than the opening between the bars to pass between the stripper bars.

The strength of the stripper bars is such that if most of the stripper bars of a header unit is stopped by an obstruction or unlevel ground, the wheels of the harvesting tractor generally will slip or spin before damage is done to the stripper bars.

Detailed Description of Paddle Chain Frame, Conveyer and Paddles

The paddle chain frame unit, paddle chain and paddles will be discussed with reference to FIG. 6 of the drawings.

The rear sprocket (26) and the front sprocket (27) are mounted for rotation on the ends of frame member (6) and the frame member (6) extension member (7). The rear drive sprocket (26) rotates with the drive axle (28). The front sprocket (27) is an idle sprocket and rotates around axle (28a). The distance between the drive axle (26) and the idle axle (27) can be 24 to 32, preferably about 28 inches. The diameter of rear sprocket (26) can be 3.5 to 5.5, preferably about 4.5 inches. The frame (6) and extension (7) are disposed about parallel to the dotted line (25) path of paddle tip (9b) up the inclined stripper bars (20). The paddle tip (9b) at its closest approach to the front of the inclined stripper bar (20), at a point just past curve (23) is about ½ to 3 inches, preferably about 1 inch. The paddle tip (9b) at a point about opposite the stripper bar point (24a) where the paddle (9) disengages from the stripped cotton bolls is at a distance of 2 to 5 inches, preferably about 3 inches from the stripper bar point (24a).

The end point (9b) of the paddle (9) travels along the dotted line (25) and changes from a position close to the stripper bar (20) to where it pushes the stripped cotton bolls rearward and up the inclined straight portion of the stripper bar (20) to a point opposite the point (24a) on the stripper bar where the paddle (9) disengages from the cotton bolls.

The conveyor chain (8) is wrapped around the rear sprocket (26) and the front sprocket (27) and with regard to a view facing the FIG. 6 rotates in the counterclockwise direction. The chain (8) has mounted thereon 2 to 8, preferably 4 to 6, e.g. 4 paddles (9). The paddles (9) are attached to a chain link by a hinge (12). The hinge (12) includes a back up bar (11) and a chain stiffener bar (10). The back up bar (11) maintains the paddle (9) in a position that is about 90° relative to the dotted line (25) path of the paddle (9) driving the paddles rearward and upward up the straight portion of the inclined stripper bar (20). The stiffener bar (10) lays along and parallel to chain (8) and maintains the chain (8) in a relatively straight position as the paddle pushes stripped cotton up the inclined portion of the stripper bar (20). In the absence of the stiffener bar (10) and/or in the event of slack in the chain (8), the paddle (9) would not be maintained in a position of about 90° relative to the dotted line (25) path of the tip (9b) of the paddle (9).

The back up bar (11) is rigidly secured to the stiffener bar (10) and the hinge (12). The paddle (9) is movably connected to the hinge (12) and is capable of rotating 90° forward in the direction of motion of the paddle (9). The stiffener bar (10) is about the same length as the paddle (9) and the back up bar (11) is about ⅓ the length of the paddle (9). The paddle (9) is about the same width as the stripper units, and is about 14 to 59, preferably 35 to 39 inches wide. The length of the paddle (9) is selected such that it does not at the front end of the header unit come closer than ⅜ to ½, preferably about 1 inch from the stripper bar (20). The length of the paddle (9) is such that it does not during its operation come into contact with the stripper bars (20). The stiffener bar, because of its length, maintains the chain in a relatively straight line during the time the paddle (9) pushes the stripped cotton up the inclined portion of the stripper bar (20) and maintains the paddle (9) at an about 90° angle relative to the inclined portion of the stripper bar (20).

The hinge (12), the back up bar (11) and the stiffener bar (10) can be made as an integral unit and can be attached to a link of chain (8).

The paddle can be made from 16 to 8 ga, preferably about 10 ga (e.g. ⅛ inch) thick steel sheet, or 12 to 6 ga, preferably about 8 ga (e.g. about 3/16 inch) thick aluminum sheet to reduce weight.

The conveyor chain (8) and paddles (9) as shown in FIG. 4 rotate counterclockwise around the rear sprocket (26) and front sprocket (27). As the paddle pushes stripped cotton up the upwardly inclined portion of the stripper bars (20), the paddle (9) is generally perpendicular to the conveyor chain (8) and the stripper bar (20). As the conveyor chain and paddle (9) pass around the rear sprocket (26) and the paddle (9) moves to a position on the top of the conveyor chain (8), the paddle (9) rotates forward by gravity around the hinge (12) such that the paddle (9) is positioned flat and parallel to the conveyor chain (8). As the conveyor chain continues moving and moves around the idler sprocket (27) the paddle (9) by gravity assumes a position perpendicular to the ground and parallel to the stalks of the cotton to be harvested. This movement of the paddles (9) allows the paddles to approach the cotton plants in a nonaggressive manner and to move with the cotton plants rearward and to move stripped cotton bolls up the inclined stripper bars (20).

The speed of the header assembly in a forward direction over the ground can be 1 to 10, preferably 3 to 6 miles per hour (88 to 880, preferably 264 to 528 feet per minute) depending on the conditions of the ground and the population of the cotton plants to be harvested. The movement of the conveyor chain in a counterclockwise direction can be 75 to 750, preferably 225 to 450 feet per minute, and is slower than the speed of the header assembly over the ground. The difference in speed of the conveyor chain and the speed of the header assembly over the ground can be 4 to 18, for example 10 to 14 feet per minute.

It is an important feature of the present invention that the speed of the header assembly over the ground is slightly more than the speed of the paddles. This situation allows the paddles to approach the cotton stalks in a non-aggressive manner and to gently push the stripped cotton up the inclined stripper bars.

Operation of the Invention

With the invention of this broadcast header, the efficiency of harvesting of broadcast cotton is greatly improved. Cotton can be planted in complete randomness with no hints of rows, grown short or reasonably tall, or even grown with a reasonable amount of weeds on relatively rough terrain. This header will harvest any given condition of broadcast cotton better and faster than any known header to this date. The procedure of using this broadcast cotton stripper header is as follows. The header is lowered to the ground ready to approach the broadcast cotton plants. When the header is lowered to field operating position, the height control is ready for operation as soon as the machine progresses in a forward motion. The cotton stripper tractor fan, cross auger, and header are engaged with power and sped up to operating revolutions per minute (RPM). The first thing that touches the cotton is the unit side plate (14) and/or dividing horn (15) (FIG. 4), which defines the stripper header swath through the cotton field. As the header progresses further, the beveled (sharpened) tips (21) of the stripper bars (20) (FIGS. 3 and 4) part the cotton plants at the base of the plant near the ground (FIGS. 3 and 4). The cotton stalks (62) slide between the stripper bars to begin the stripping process. At this point, the cotton bolls (61) are above the stripper bars (FIG. 4) and are approaching the incline of the stripper bars (20) and the engagement of the paddles (9) along the dotted line (25). With forward motion, the lower bolls (61) on the cotton plant are stripped from the cotton stalk (62). At about the same time, a paddle (9) is approaching engagement with the cotton boll (61) from above while the boll is lying on top of the stripper bars. With further forward motion of the cotton stripper, the next higher bolls on the stalk are severed or stripped from the stalk (62). At this point, the cotton bolls are being pushed up the incline of the stripper bars (20) further by the engaged paddle (9). The paddle, while engaged, is held perpendicular to the chain (8) by a chain stiffener bar (10) and a back up bar (11) (FIGS. 4 and 6). The chain stiffener bar (10) is longer than the hinge radius of the paddle (9). Without the chain stiffener, the paddle could not be held perpendicular to the chain while pushing the cotton bolls up the incline of the stripper bars (20). The paddles are moving in a rearward direction up the incline at a pace slightly slower than the ground speed of the cotton stripper tractor. This allows the top of the cotton stalks to gently bend forward and become perpendicular to the stripper bars while gently regulating the engagement of the paddles with the already stripped cotton bolls. As the cotton stripper moves forward the tall cotton plants tend to float the hinged paddle upwardly toward the chain on the paddle frame (6). This action prevents the paddle from becoming too aggressive with the cotton stalk, which may result in ripping bark or unnecessary limbs from the stalk that would enter the flow of cotton bolls. Unnecessary bark and limbs increase ginning charges and reduce cotton grades. The paddles do not need to be engaged as soon in tall cotton because the tall stalks will push the bolls up the stripper bar incline anyway. Short cotton needs the paddles engaged as soon as the cotton bolls are stripped or severed from the stalk. Short cotton will not float the paddles. Therefore, the paddles are engaged in short cotton as soon as they travel down the front of the lower chain idler (27). The variability of the engagement of the paddles is one of the unique and important features of the header unit of the present invention. As the stripper tractor continues in a forward motion, the paddle (9) is continuing to push the cotton bolls (61) up the incline of the stripper bars (20). While taking the cotton up the incline of the stripper bars, the paddles are slowly beginning to disengage along the dotted line (25) with the cotton bolls in preparation for rolling the cotton bolls down the tail end (24) of the stripper bars into the cross auger unit (E) (FIG. 1). This disengagement process is accomplished by a design that gradually increases the distance between the tip of the paddle and the top surface of the stripper bars as the cotton bolls move rearward. For the herein described stripper header unit, each paddle frame has four paddles attached to the paddle chains (8). Therefore, as one paddle is finishing with its work travel path of bringing cotton up the stripper bar incline, another paddle is being positioned to repeat the prior paddle's action. The paddle that just finished its job and released the cotton bolls into a cross auger unit travels around the rear sprocket (26) of the paddle frame (6). When the paddle travels past and over the rear sprocket, gravity folds it forwardly over 90 degrees to lie flat on the chain (8) or parallel to the chain. The paddle continues its journey forward lying flat on the chain or parallel to the chain. Thus, it will be in position to enter the cotton plants as it travels around the front of the forward lower chain sprocket idler (27) in a perpendicular to the ground or vertically downward position to start its work process all over again. Basically, the paddle moves a swath of cotton the width of the header unit from cotton stripped from the stalk to cotton in a cross auger unit and headed for the air duct (G) and a cotton stripper basket (D) of the cotton stripper (C) (FIG. 1).

While the above mentioned process has been occurring, other processes have occurred also. Height control of the header units has intermittently and/or continuously taken place to keep the stripper bar tips (21) at an about constant distance from the ground and under the bottom cotton bolls on the plants such that the stripper bars only lightly touch the ground (FIG. 4). The height control is an important feature of the invention. The height control is accomplished by the lower curvatures (23) of the stripper bars (20) and the support and actuating components (FIG. 8) of each individual unit. The tip (21) of the stripper bar (20) is slightly curved toward the ground. This provides a lifting motion that gets the lower cotton bolls above the stripper bars so that the cotton bolls are captured. There is a slight rise (22) in the stripper bar from the ground just behind the tip (21) of the stripper bar and before it curves toward the ground. The purpose of this slight rise (22) is to prevent cotton from falling over the tip (21) of the stripper bar onto the ground. This could happen when the header unit is either stopped from traveling forward or lifted from the ground. The curvature (22) provides an anti-drip insurance. The stripper bar then curves toward the ground and then upward in front of the straight portion (20) of the stripper bar forming a curve portion (23). The curve (23) at the bottom of the straight portion of the stripper bar is there for two reasons. First, the curve (23) allows the tip of the paddle (9) travel circumference to engage with cotton sooner than if the stripper bars were only straight. This curve (23) makes the stripper bars closer to the paddle tip sooner. Second, the bottom of the curve (23) of the stripper bars makes an excellent rounded surface to slide on and along the ground for height control action. The combined strengths of all twenty-five stripper bars give each individual header unit an excellent footing on the ground to prevent the tips from digging into the ground. When the curved (23) underneath surface of the stripper bars drags on the ground, for example, if the ground is unlevel or rough, the gravitational weight of the unit on the support tube (2) is less. The oblong holes (31) in the unit side plates (14) (FIG. 9) are placed over the support tubes (2) (FIGS. 7–9). This moves the header unit rearward and raises the unit in the oblong holes (31) in the unit side plates (14) so the back of the header unit curved wall (30) presses on roller (33) that moves lever (34) that presses the hydraulic control valve (37) to raise the front of the unit slightly above the ground. When the header unit is raised it pivots upward around the axle (28). This integral frame height control mechanism is very unique. It requires no control rods or linkages that wear and delay height control action. After the front of the header unit is raised, the header unit drops back down in the oblong holes (31) which releases the hydraulic control valve (37). The unit then drops because the ground lifting pressure under the lower curves (23) of the stripper bars (FIG. 4) is eliminated when the unit was raised. As soon as the ground pressure under the stripper bars is great enough to push the unit rearward in the oblong holes (31), the header unit is raised again. This process occurs repeatedly through the field providing excellent height control for the stripper bars. This technique of height control prevents digging of the stripper bar tips into the ground or jumping of the unit. The process is very accurate, defined, definite, and is very durable and low maintenance.

During the stripping process in the field, the weed sickle (FIG. 10) is preventing the weeds from interfering with the flow of cotton up the inclined portion of the stripper bars (20). This is accomplished by a weed sickle bar unit (42–46) that is mounted under the stripper bars (20) and immediately in front of the unit support tube (13) (FIGS. 6 and 11). (It is noted that a sickle bar has heretofore been used on a grain combine header or a hay cutting header for cutting and harvesting grain or hay, that is, where the cut crop is harvested.) The sickle sections (42) are riveted to the sickle bar (44) with the two sharp serrated side edges (43) of the sickle section (42) facing away from the bar (44) (FIG. 11). The two serrated sections (43) of the sickle with the sharp edges of the sickle section slide under the stripper bars (20). The sickle bar is driven so that it slides side to side under the stripper bars (20). This side motion shears any plant material such as a weed that gets trapped between the stripper bars and brought up the incline of the stripper bars by the paddles. This shearing process is very positive and sure. A stationary pipe (60) is mounted under the front tip of the sickle sections to prevent the top of a cotton stalk from entering the sickle shear zone. Therefore, only a very tall weed or a weed that has been pulled by the roots would make a path up the inclined stripper bars to be sheared by the sickle. The weed sickles under each header unit are driven by an open gear train comprised of right angle bevel tooth gears (52) (FIG. 11) held in configuration by a support structure (53). Each header unit has an individual sickle drive. The associated gear structure is mounted to the cross auger frame unit (E) (FIG. 1) by two bolts (64) and underneath each header unit with all units driven simultaneously by a transversely mounted one inch hex drive shaft (28b). A sprocket (58) mounted on the one-inch hex shaft (28b) is driven off of the paddle chain drive shaft (28) by a chain drive (56a) (FIG. 2). A sprocket (56) welded to the coupler between the orbit drive motor (41) and the paddle chain drive shaft (28) drives the chain drive (56a) (FIG. 2). The one-inch hex drive shaft (28b) bisects each unit's drive bevel gear. The drive bevel gear directs power to the driven bevel gear and on forward through a one-inch hex shaft (28c) held in place by two bearings attached to the support structure. This hex shaft (28c) transfers power through a slide collar that allows up and down motion of the header unit. The slide collar transfers power to the radius pitman arm lever. The slide collar-radius pitman arm lever components are held in position with the header unit by a bearing and support apparatus hinged to the header unit support tube by a flexible pin joint. The radius pitman arm lever rotates around an axis provided by the slide joint drive shaft from the sickle unit bevel gear drive to create a three-inch side to side movement of the sickle drive bar pitman arm. The sickle drive bar pitman arm has flex ball joints on each end. The first end attaches to the radius arm lever with a bolt through the ball joint. The second end attaches to the sickle with a bolt through a ball joint. The sickle is in front of the main unit support tube and under the stripper bars (cobra bars). The sickle is held in place under the stripper bars (20) by a sickle clip (46) that is bolted to the header unit support tube (13). The sickle is driven side to side so as to shear any plant material that may be directed into its path.

The power for the whole header assembly (paddle chain assemblies and the unit weed sickles) is the hydraulic orbit motor (41) (FIG. 2) on the right end of the header assembly as viewed by the driver of the stripper tractor. All of the moving parts of the header assembly turn or move very slowly compared to other high tech machines of this type. Therefore, the header assembly has an exceptionally long and useful wear life.

Utility of the Invention

The header assembly of the present invention can be readily attached to and used with existing harvest combine tractors. The header assembly harvest capacity can be varied depending on the harvest capacity of the combine harvester and the density of the cotton plants by using two header units for a small capacity and small harvest up to about eight header units for a large harvest and large capacity harvest combine. The header assembly can be used to harvest tall or short row cotton as well as tall or short broadcast cotton. The header assembly can efficiently be used to harvest cotton on level and smooth land as well as to harvest cotton on land that has some degree of unevenness and/or land that contains rocks or other small obstructions.

The header assembly can also be used to harvest row cotton, either by driving down the rows or by driving at an angle to the rows.

The preferred harvest condition would be to harvest medium height broadcast cotton where the cotton plants are spaced apart about 5 to 9, preferably 6 to 8 inches on relatively level land. Under these conditions a maximum advantage of the header assembly can be realized.

What is claimed is:

1. Cotton harvester header assembly containing two or more header units wherein each header unit comprises
   (1) a paddle chain frame unit having a length and a width and operatively attached to a
   (2) stripper bar unit having a plurality of stripper bars and an upper surface to harvest cotton by stripping cotton bolls from cotton stalks, and
   (3) a height sensing unit which senses and maintains the distance of the stripper bar unit relative to the ground, wherein the paddle chain unit comprises two parallel frame members having a front end and rear end, the rear end of the frame members have rotatably mounted thereon two drive sprockets, the front end of the frame members have mounted thereon two idler sprokets, the rear drive sprockets turn around an axle and the front idler sprockets turn around an axle, the drive sprockets and idler sprockets have wrapped around them conveyor chains comprising chain links which chains rotate around the front and rear sprockets, the conveyor chains have attached to them, evenly spaced apart, two or more paddles, the paddles are attached to the chain links by hinges, the hinges allow by gravity the movement of the paddles through a 90° arc as the conveyor chain paddles rotate around the front and rear sprockets, wherein when the paddles are disposed below the chain the paddles are at an angle of about 90° relative to the chain and when the paddles are disposed above the chain they rotate by gravity about 90° forward in the direction of the rotation of the chain to assume a position about parallel to the conveyor chain, the paddle chain unit is operatively connected to the stripper bar unit to push cotton bolls stripped by the stripper bar unit rearward along an upwardly inclined upper surface of the stripper bar unit.

2. The cotton harvester header assemble header unit of claim 1 which further contains a weed sickle unit to cut of weeds or other plants which may collect on the upper surface and between the stripper bars of the stripper bar unit and interfere with the harvesting of cotton.

3. The cotton harvester header assembly header unit of claim 1 wherein the paddle chain unit has attached to a link of the conveyor chain a hinge, which hinge has secured thereto a back up bar which is vertically disposed relative to the conveyor chain and a stiffener bar which is attached to the back up bar and horizontally disposed relative to the conveyor chain.

4. The cotton harvester header assembly header unit of claim 3 wherein the back up bar is about ⅓ in height of the length of the paddle, and the stiffener bar is about the same length as the paddle.

5. The cotton harvester header assembly header unit of claim 2 wherein the weed sickle unit is disposed at a position passed midway up the inclined straight portion of the stripper bars and beneath the stripper bars at about the point at which the stripper bars are attached to a support bar, said weed sickles being attached to a sickle bar and operatively connected to reciprocate at right angles to the stripper bars and to cut any materials that become wedged between the stripper bars.

6. Cotton harvester header assembly containing two or more header units wherein each header unit comprises
   (1) a paddle chain frame unit having a length and a width and operatively attached to a
   (2) stripper bar unit having a plurality of stripper bars and an upper surface to harvest cotton by stripping cotton bolls from cotton stalks, and
   (3) a height sensing unit which senses and maintains the distance of the stripper bar unit relative to the ground, wherein the stripper bars are evenly spaced apart to provide a width which is about the same width as the paddle chain frame unit, said stripper bars having a front end portion and a rear end portion, the front end portion is adapted to touch the ground and to pass lightly over the ground when the header assembly moves forward over the ground, the front end of the stripper bars have a front tip portion which curves first upwardly and then downwardly to form a first upwardly curved portion, and then after curving downwardly forms a reverse curve upwardly to form a second, downwardly curved portion, the downwardly curved portion then turns upwardly to form an upwardly inclined straight portion, then back end portion curves downwardly to form a third curved portion, the stripper bars are disposed at an angle inclined upwardly from the ground from front to rear and in close relationship to and cooperation with the paddle chain unit, but a sufficient distance from the chain unit such that the ends of the paddles do not come into contact with the stripper bars as the paddles travel around the paddle chain from unit.

7. The cotton harvester header assembly header unit of claim 6 wherein the second, downwardly curved portion of the stripper bar performs a function of a sensor to sense the location of the ground relative to the rear sprocket drive axle around which the drive sprocket rotates.

8. The cotton harvester header assemble header unit of claim 6 which further contains a weed sickle unit to cut off weeds or other plants which may collect on the upper surface and between the stripper bars of the stripper bar unit and interfere with the harvesting of cotton.

9. Cotton harvester header assembly containing two or more header units wherein each header unit comprises
   (1) a paddle chain frame unit having a length and a width and operatively attached to a
   (2) stripper bar unit having a plurality of stripper bars and an upper surface to harvest cotton by stripping cotton bolls from cotton stalks, and
   (3) a height sensing unit which senses and maintains the distance of the stripper bar unit relative to the ground, wherein the header unit height sensing unit functions cooperatively with the stripper bar unit to sense and maintain the front part of the stripper bars in a specified relationship over the ground and which comprises an end plate on each side of the header unit, said end plates are firmly attached to the stripper bars, each of said end plates having at the upper back end of the end plates an elliptical shaped opening through which the rear drive sprocket of the paddle chain frame unit passes, the elliptical shaped opening axis is aligned with an is disposed generally parallel to the paddle chain frame and is of sufficient length such that it allows movement of the side plates and elliptical shaped opening rearward a short distance relative to the rear axle of the drive sprocket along the axis of the elliptical shaped opening in the side plates, the side plates have a front and back end, the back end of the side plates have a curved back plate, when the header unit is at rest the rear drive sprocket axle is positioned at the rear part of the elliptical opening, when the header unit moves forward and, in such case when it encounters unlevel land, rough land or an obstacle, the stripper bars sense the situation and cause stripper bars and the side plates to move rearward relative to the drive sprocket axle such that the rear sprocket drive axle is positioned at the front portion of the elliptical opening, this movement activates a hydraulic system which lifts the front end of the stripper bars and the front end of the side plates a sufficient distance to have the stripper bars and the front end of the side plates to pass over the unlevel land, rough land or an obstacle, after the hydraulic system lifts the side plates thee drive sprocket axle moves back to its original position in the back of the elliptical opening which deactivates they hydraulic lift system and the stripper bars return to their original position touching the ground.

10. The cotton harvester header assembly header unit of claim 9, wherein the back end of the side plates have a curved back plate having an arc which has a radius which is about the same as the radius of the arc of the elliptical opening in the side plate, when the side plate is moved rearward the curved portion of the back plate contacts a roller and lever mechanism which activates the hydraulic system to lift the front end of the stripper bars and side plates above the unlevel land, rough ground or an obstacle.

11. The cotton harvester header assemble header unit of claim 9 which further contains a weed sickle unit to cut off weeds or other plants which may collect on the upper surface and between the stripper bars of the stripper bar unit and interfere with the harvesting of cotton.

12. A method of harvesting cotton which comprises providing the cotton harvester header assembly of claim 2, 1, 3, 4, 6, 7, 9, 10 or 5, and operating and moving the cotton header assembly through a field containing cotton.

13. A method of harvesting cotton which comprises moving a cotton harvester header assembly through a field containing cotton wherein the cotton harvester header assembly comprises individual header units comprising a paddle frame unit which is inclined upwardly front to rear, said paddle frame unit having a length and width, a conveyor chain and paddle pivotally connected to the conveyor chain, and being positioned to operate with a stripper bar unit, said stripper bar unit having a plurality of stripper bars having front and back ends with spaces between the stripper bars, said stripper bars having an upper surface and said stripper bars being inclined at an upward angle, from front to rear, and being disposed about parallel to the paddle frame unit,
   wherein said method comprises moving the header assembly forward to have the front of the stripper bars come in contact with cotton stalks containing thereon cotton bolls, while the front of the stripper bars slide lightly on the ground, as the header assembly moves forward, the front of the stripper bars slide under the cotton bolls on the cotton stalks, as the cotton stalks enter the spaces between the stripper bars, because of the forward movement of the header assembly and the upwardly inclined stripper bars and due to the space between the stripper bars being less than the size of the cotton bolls, the cotton bolls are stripped from the cotton stalks and retained on the upper inclined surface of the stripper bars, the paddles of the paddle frame unit are pivotably attached to the conveyor chain which moves around the frame unit in a manner such that the paddles as they move around the front of the frame unit enter the cotton stalks at an angle perpendicular to the ground and parallel to the cotton stalks, as the paddles continue their movement around the frame unit and on the underside of the frame unit they become disposed at an angle about perpendicular to the stripper bars and come into contact with and push the stripped cotton bolls up the surface of the inclined stripper bars, when the cotton stalks are cleaned of their cotton bolls they pull through the spaces between the stripper bars and flip out under and behind the stripper bars, the paddles continue to push the stripped cotton rearward and out of the end of the header assembly, as the paddle reaches the rear end of the paddle frame unit, the conveyor chain and attached paddle moves around the end of the unit and to the top of the frame unit, the paddle pivots forward about ninety degrees to lie flat and parallel to the conveyor chain, as the conveyor chain continues its movement, the paddle moves around the front of the paddle frame unit and the paddle enters the cotton stalks at an angle about perpendicular to the ground and parallel to the cotton stalks to repeat the process.

14. The method of claim 13 wherein the paddle frame unit conveyor chain has attached thereto and evenly spaced thereon four paddles.

15. The method of claim 13 wherein the stripper bars have a front end portion and a rear end portion, the front end portion is adapted to touch the ground and to pass lightly over the ground as the header assembly moves forward over the ground, the front end of the stripper bars have a tip portion which curves first upwardly and then downwardly to form a first upwardly curved portion and then curves downwardly and upwardly again to form a second, downwardly curved portion, the second, downwardly curved portion, then forms the upwardly inclined portion of the stripper bar up which the paddles push the stripped cotton.

16. The method of claim 15 wherein the second, downwardly curved portion of the stripper bar passes under the cotton bolls and moves lightly, over the ground as the header assembly moves forward over the ground.

17. The method of claim 15 wherein when the front end of the stripper bar contacts an unlevel or rough portion of ground or a small obstruction there is activated a hydraulic lift assembly which lifts the front end of the header unit and stipper bars which contacted the unlevel or rough portion of ground or small obstruction to a sufficient height to pass over the unlevel or rough portion of ground or small obstruction, after which the header unit returns to its normal operating position with the front of the stripper bars lightly passing over the ground.

* * * * *